United States Patent [19]
Matson

[11] Patent Number: 5,194,158
[45] Date of Patent: Mar. 16, 1993

[54] RADON REMOVAL SYSTEM AND PROCESS

[76] Inventor: Stephen L. Matson, 15 Withington La., Harvard, Mass. 01451

[21] Appl. No.: 861,422

[22] Filed: Mar. 31, 1992

Related U.S. Application Data

[63] Continuation-in-part of Ser. No. 539,005, Jun. 15, 1990, Pat. No. 5,100,555.

[51] Int. Cl.$^5$ .............................................. B01D 61/00
[52] U.S. Cl. .................................... 210/651; 210/650; 210/679; 210/155.2; 210/805; 55/16; 55/47; 55/158
[58] Field of Search ................ 210/650, 651, 661, 679, 210/195.2, 195.3, 170, 750, 747, 321.64; 55/47, 48, 16, 158

[56] References Cited

U.S. PATENT DOCUMENTS

| | | | |
|---|---|---|---|
| 4,064,436 | 12/1977 | Ward, III | 55/16 |
| 4,230,463 | 10/1980 | Henis et al. | 55/68 |
| 4,371,383 | 2/1983 | Rost | 210/169 |
| 4,756,724 | 12/1988 | Yuill | 210/165 |
| 4,789,468 | 12/1988 | Silkar | 210/321.64 |
| 4,869,832 | 9/1989 | Lamarre | 210/747 |
| 4,961,759 | 10/1990 | Taylor | 55/16 |
| 5,045,215 | 9/1991 | Lamarre | 210/750 |
| 5,100,555 | 3/1992 | Matson | 210/651 |
| 5,104,554 | 4/1992 | Dempsey | 210/170 |

Primary Examiner—Robert A. Dawson
Assistant Examiner—Ana Fortuna
Attorney, Agent, or Firm—Hamilton, Brook, Smith & Reynolds

[57] ABSTRACT

Method and apparatus for removing dissolving radon gas from water for the purpose of reducing the exposure of household occupants to elevated airborne radon levels. Radon removal is accomplished by a membrane - mediated air stripping process which is based on the passage of radon from water (28) flowing along one surface of the membrane to stripping air (27) flowing along the second surface of the membrane. Particularly useful are dense polymeric membranes comprised of silicone rubber and hydrophobic microporous membranes. The dense membranes may be self-supporting, but are preferably composite membranes consisting of a dense film on a porous support membrane. The system can employ a subsystem for storage and recirculation of treated water through a housing in which the radon-permeable membrane is supported. Optionally, a hybrid subsystem can be employed which includes a carbon adsorption subsystem for the treated water downstream of the housing.

6 Claims, 9 Drawing Sheets

RADON REMOVAL SYSTEM AND PROCESS

The present application is a continuation-in-part application of co-pending U.S. Ser. No. 539,005 filed Jun. 15, 1990, now U.S. Pat. No. 5,100,555.

1.0. BACKGROUND OF THE INVENTION

1.1. RADON IN INDOOR AIR

Radon-222 has been identified as a pervasive pollutant in indoor air. Radon is now known to be responsible for the majority (55%) of the ionizing radiation dose which individuals receive from all sources —both natural and man-made—and it has been amply demonstrated that exposure to elevated levels of this gas in household air is associated with increased incidence of lung cancer.

Radon (Rn) is a naturally occuring element that is formed upon the radioactive decay of radium-226. It exists as a gas in the form of three isotopes—Rn-219, Rn-220, and Rn-222. The former two isotopes have half-lives of the order of seconds and thus are of little concern. However, radon-222 decays in a slower process that is characterized by a considerably longer half-life of 3.82 days. Radon decay proceeds with emission of alpha particle radiation through a series of solid, short-lived radioisotopes (e.g., polonium-218 and polonium-214) that are collectively referred to as radon "daughters" or progeny.

These radon daughters, which are unstable isotopes in their own right, are responsible for most of the radiation dose associated with high radon levels in air. When radon gas is inhaled, it is generally exhaled as well since its radioactive half-life is long as compared to the residence time of the gas in the lungs. However, the above-mentioned alpha-emitting polonium isotopes are solids rather than gases, and a fraction of these radon daughters are deposited on the surfaces of the airways deep in the lung when air is inhaled. The radon progeny deposited in this manner subsequently decay by emission of short-range but slow-moving and powerful alpha particles capable of damaging cells which it encounters. This alpha radiation dose is efficiently delivered to the cancer-generating stem cells present in the epithelium that comprises the surface of the air passages in the lungs.

Early EPA estimates indicated that in the United States alone some 5,000 to 20,000 lung cancer deaths a year are attributable to "natural" radon from all sources, and more recent estmates tend to be larger— e.g., between 10,000 and 40,000 lung-cancer deaths each year. Extensive surveys of radon levels in homes and schools are underway at EPA's urging, based on its finding that some 10% of the nation's homes exceed its 4 picoCuries per liter (pCi/L) action level. Congress has recently identified a long-term goal of reducing indoor radon concentrations to typical levels in the outside environment (0.1–0.7 pCi/L), and EPA is publicizing Rn mitigation measures and establishing the groundwork for eventual regulations dealing with allowable levels of radon in indoor air and drinking water.

The radon that ultimately enters the home emanates from one of three potential sources: (i) diffusion from soil gas; (ii) release from radon-laden groundwater; and/or (iii) release from radium-containing construction materials. The invention disclosed herein addresses the contribution to indoor air pollution from the second source—namely, waterborne radon.

1.2. WATERBORNE RADON

While diffusion of radon from soil gas is responsible for the greater health risk, the risk posed by volatile radon gas released into the air from household water can also be significant. By EPA's estimate, some 100 to 1800 lung cancer deaths per year are attributed to indoor air pollution caused by waterborne radon emitted into the air. The EPA estimates that radon originating from U.S. public water supplies results in a lifetime lung cancer risk of about 1 in 10,000, which is the highest risk level allowed for any currently regulated contaminants under the Safe Drinking Water Act. According to the EPA's Office of Drinking Water, waterborne radon may cause more cancer deaths than all other drinking water contaminants combined.

The transfer of radon from water to air depends on several factors—namely, its concentration in water, the quantity of water used, the intensity of agitation, and air and water temperatures. The partitioning of Rn between water and air is described by the Henry's law constant "m" defined as $$m = p/x \ (atm) \tag{1}$$

where p (in atm) is the partial pressure of radon gas in equilibrium with an aqueous solution containing mole fraction x of Rn. A wide range of Henry's law constants (from about 2600 atm to about 6300 atm at ambient temperature) have been published or can be calculated from related measures of radon's water solubility; a reasonable weighted-average value is about 5000 atm.

Efficiencies of Rn transfer have been reported to range from about 30% (e.g., for drinking and toilet flushing) to about 90% (for laundry and dishwashing) to about 5 to 99%. Such studies form the basis for the frequently cited "rule of thumb" that about 1 pCi/L of airborne radon will results from using a water supply containing 10,000 pCi/L. However, significant deviations from this rule of thumb can exist. For example, water-to-airborne radon concentration ratios can vary over a 50-fold range and are strongly dependent on air change rate; in an extreme case, as much as 5.1 pCi/L of airborne radon might result from a water supply containing 10,000 pCi/L of dissolved Rn. It has also been reported that radon levels in occupied apartments can be four to five times those in vacant ones, presumably due to water use in the former.

EPA estimates that some eight million citizens may be at risk from high radon levels in small community water systems and private wells. Several surveys have been published. As early as 1961, 228 wells in Maine and 26 wells in New Hampshire had been reported to average 53,000 and 101,000 pCi/L, respectively. By 1987, wells with waterborne radon levels in excess of 50,000 pCi/L had been reported in 10 states, and 100,000 pCi/L wells had been reported in seven. Private wells containing over a million pCi/L have been found, with radon in wells drilled in Maine in granitic formations reportedly averaging 22,000 pCi/L. The American Water Works Company system has estimated that if the EPA were to adopt a maximum allowable radon contaminant level in the range of 100–1000 pCi/L, that some three-quarters of its supplies would require treatment to meet that standard. Finally, it has been estimated that as many as 10–50% of the 45,000 public drinking water supplies based on groundwater may require some form of treatment to comply with anticipated regulations, and the number of individual problem wells is obviously much greater still.

1.3. PRIOR-ART APPROACHES TO WATERBORNE RADON REDUCTION

Removal of radon from water is now generally accomplished either by granular activated carbon (GAC) adsorption or by aeration ("Removal of Radon from Household Water," EPA Publ. OPA-87-011, September 1987; Becker, A. P. III and T. M. Lachajczyk, "Evaluation of Waterborne Radon Impact on Indoor Air Quality and Assessment of Control Options," EPA Publ. EPA-600/7-84093, 1984; Lowry, J. D., "Adsorption of Radon From Water Supplies," Proceedings of the 1984 National Conference on Environmental Engineering, ASCE, Los Angeles, Calif., Jun. 25-27, 1984). Both technologies are effective but suffer from serious drawbacks.

Granulated activated carbon adsorption. Adsorption is the most thoroughly studied and currently the most used approach (Lowry, J. D. and J. E. Brandow, J. Env. Engr., 111:4 (1985) 511-527; Lowry, J. D. et al., J. Am. Water Works Assoc., 79:4 (1987) 162-169). In these systems, dissolved radon gas is physically adsorbed on a packed bed of high-surface-area activated carbon; this adsorbed radon decays to produce nonvolatile species that are retained on the bed, with the result that the adsorptive capacity of the GAC for radon is regenerated. Although "under-the-sink" carbon filters are too small to be effective ("Fit to Drink?," Cons. Repts., 55:1 (1990) 27-43; Gabler, R., Is Your Water Safe to Drink?, Consumers Union, Mount Vernon, N.Y., 1987), properly designed and operated 1.5-2.0 cubic foot GAC tanks are capable of reducing waterborne radon levels by 90% from 100,000 to 10,000 pCi/L. According to the first of the above-cited EPA reports, a 3.0 cubic foot unit is capable of treating 250 gallons per day (GPD) of 1,000,000 pCi/L water.

While admittedly effective, GAC adsorption exhibits several major and minor drawbacks (Cothern, C. R., J. Am. Water Works Assoc., 79:4 (1987) 153-158). The equipment is not insignificant in size or cost, and the activated carbon medium is capable of supporting bacterial growth that can lead to microbiological contamination. Plugging of the bed with iron and sediments can occur, with the result that the unit must be protected by a cartridge prefilter which itself requires periodic replacement. Even so, backwashing may be required at intervals.

Perhaps the most troublesome disadvantage of GAC adsorption, however, relates to accumulation on the bed of other radionuclides that emit gamma radiation, some of which (e.g., Pb-210 and Po-210) are long-lived. Treatment of high-radon-content water can require either shielding of the GAC tank or, in extreme cases, location of the tank outside the house. In addition to the safety issue that this poses, disposal of the spent carbon at the end of its life as a low-level radioactive waste poses still other problems.

Aeration. Aeration can take one of two forms—(i) spray aeration by means of nozzles or splash plates (Rost, K. L., U.S. Pat. No. 4,371,383, February 1983), or (ii) diffused bubble aeration wherein air is compressed and introduced at the bottom of a water tank that also provides some storage capacity. Diffused bubble aeration has been investigated in both batch and continuous-flow modes of operation and found capable of 80 to 95% or higher radon reductions (Lowry, J. D. and J. E. Brandow, J. Env. Engr., 111:4 (1985) 511-527; "Removal of Radon from Household Water," EPA Publ. OPA-87-011, September 1987; Cothern, C. R., J. Am. Water Works Assoc., 79:4 (1987) 153-158; Lowry, J. D. et al., J. Am. Water Works Assoc., 79:4 (1987) 162-169). FIG. 1 illustrates a typical diffused-bubble aeration system. Such a system includes a source 12 of raw water pumped by a first pump 13 and a source 14 of air (compressor or pump) supplying an air diffuser 15 at the bottom of tank 11. This side of the system is controlled by a pump level control box 16, a variable timer 17, and an air flow regulator 18. It is provided with liquid level proves 19 and an outside vent 20 for air-stripped radon.

Aeration has the significant advantage relative to GAC adsorption of avoiding a radioactivity/disposal issue. However, this advantage is gained at the price of greater system complexity and a cost that is considerably higher than that of GAC units. Some of this additional complexity is associated with the second water pressurization that is required (i.e., a second pump 21 is needed as well as a hydropneumatic tank 22 with an outlet 23 to household water use), since aeration is conducted at atmospheric pressure. Moreover, since the head of water must be overcome, the cost of pressurizing the stripping air with a compressor or pump is not insignificant. Annual operating costs for individual aeration systems are typically about twice those associated with GAC units, and aeration systems can be large and noisy.

Finally, we note that aeration appears superior to GAC adsorption where treatment of groundwater supplies distributed by relatively small water systems is concerned. On the one hand, the long "empty bed contact time" (EBCT) that would be required with GAC adsorption renders this approach impractical, and the large size of the bed would further aggravate the ultimate GAC disposal problem. Both packed-tower aerators and cascading tray aerators have been investigated (Dixon, K. L. and R. G. Lee, J. Am. Water Works Assoc., 80:7 (1988) 65-70; Dyksen, J. E., D. J. Hiltebrand and R. Guena, "Treatment Facilities and Costs for the Removal of Radon from Ground Water Supplies," Proceedings of the 1986 Specialty Conference on Environmental Engineering," ASCE, Cincinnati, Ohio, Jul. 8-10, 1986, pp. 510-521).

In conclusion, what is clearly needed is an improved approach for removing radon from small water systems and private wells that addresses the above-cited limitations of conventional GAC and aeration systems.

Particularly advantageous in mitigating the health effects attributable to indoor air pollution caused by waterborne radon would be an improved aeration system characterized by the following benefits:

High radon removal efficiency
Simple, compact, quiet, and rugged
Low capital and operating cost
Capable of operation with pressurized water and ambient pressure air
Wide operating range
No radioactivity buildup or GAC disposal problem
Operating lifetime not limited by sorption of organic contaminants or microbial growth The membrane stripping method and apparatus of the present invention are capable of providing these benefits relative to conventional radon removal systems and processes of the prior art.

2.0. SUMMARY OF THE INVENTION

Briefly stated, the present invention pertains to method and apparatus for removing dissolved radon gas from water for the purpose of reducing the exposure of household occupants to elevated airborne Rn levels. Of particular interest is the application of the present invention to the treatment of water from individual household wells and small municipal or community wells based on groundwater supplies.

The method and apparatus of the present invention for removal of waterborne radon are depicted in one embodiment in FIG. 2. Radon removal is accomplished by a novel membrane-mediated air stripping process which is based on deploying a radon-permeable membrane at the interface between gaseous and liquid process streams—i.e., between stripping air at near-ambient pressure and water undergoing treatment at or near the normal water supply system pressure. Membranes suitable for use in the present invention will always have in common the property of their being highly permeable to the passage of radon gas while being substantially impermeable to the passage of either of the bulk phases (i.e., water and stripping air) which they contact under their conditions of use as specified further below.

In operation, water (e.g., from a well) is passed along one surface of a membrane in a high-surface-area membrane module, while stripping air is passed along the second surface of the membrane. Radon diffuses from the water stream into the stripping air. A sufficient area of Rn-permeable membrane and a sufficient flowrate of stripping air are provided to ensure that the desired degree of radon removal is accomplished at a reasonable rate from a given amount or flowrate of water to be treated. Membranes are attractive in this application because they can allow rapid and efficient mass transfer in compact devices. Moreover, they are immune from flooding and channeling problems, and they are capable of operating effectively both at very small scales (pertinent to household applications) and over a wide range of air and water flowrate ratios.

The Rn-permeable membrane of the present invention serves to permit selective transport of radon gas from the water being treated to the stripping air stream, while simultaneously contacting and separating said air and water phases in a high-surface-area membrane device. More specifically, the present process involves the removal of dissolved radon gas from radon-laden water by its transfer across a suitable membrane and into a stripping air stream that is subsequently safely discharged to the outdoors. Radon transport occurs in a series of three steps: (i) diffusion of dissolved radon gas from the "bulk" water stream undergoing treatment across an aqueous-phase "boundary layer" or "stagnant film" to a first surface of a radon-permeable, bulk-water-and-air-impermeable membrane; (ii) partitioning of radon gas into the membrane, and its diffusive permeation across said membrane under the influence of a transmembrane gradient in its chemical potential; and (iii) its subsequent release from the membrane and diffusion into the stripping air stream (generally with negligible mass transfer resistance) in contact with a second surface of said membrane. It should be noted that the membrane's property of being impermeable to bulk water and air transport is defined in the context of the specific type of membrane being used and the specific conditions of its use, as discussed further in Section 4.0 below. Moreover, it should be noted that the transport of radon from water to stripping air occurs by diffusion rather than by convection. Despite the fact that a pressure difference is generally maintained across the membrane, no pressure-driven, convective transport of radon occurs in the practice of the present invention.

It is a novel and particularly useful feature of the membrane-based air stripping process of the present invention that the stripping air stream will generally be maintained at a pressure substantially below that of the water undergoing treatment; typically, it will be supplied to (or drawn through) the membrane stripping module either by a low-pressure fan or by a blower. In contrast, aeration processes of the prior art generally require that the well water first be depressurized and subsequently stripped at near-atmospheric pressure—as opposed to being treated at the elevated pressure of the household water supply as is made possible by the present invention. To do otherwise with conventional aeration methods and equipment would previously have entailed the provision of a compressor to pressurize and deliver stripping air at high pressure, which adds aeration system capital and operating costs and operating-/maintenance complexities that have proven to be unacceptable in practice. It may be further noted that stripping air for use in the present process may be withdrawn either from inside or outside the house and employed without any elaborate pretreatment.

This invention is capable of being carried out with membranes having a variety of forms and configurations. For instance, hollow-fiber and other high-surface-area (e.g., tubular, flat-sheet, and spiral-wound) membrane modules are particularly suited to the practice of the invention, although hollow fibers provide significant advantages in terms of low cost and high packaging density. Hollow-fiber membrane devices resemble shell-and-tube heat exchangers in construction, wherein typically polymeric hollow fibers replace the heat transfer tubes. These fibers generally have have inner diameters (IDs) ranging from about 100 to 1000 microns, with fiber wall thicknesses varying from about 25 to 250 microns as a rule. Values for membrane surface area per volume range of typical membrane devices range from about 30 $cm^2/cm^3$ to about 100 $cm^2/cm^3$ (1200 to 4000 $ft^2/ft^3$). To provide some perspective, note that a hollow-fiber artificial kidney for hemodialysis typically contains 1 $m^2$ (11 $ft^2$) of fiber area in a 9-inch-long shell about 1.5 inch in diameter.

As regards module design and flow configuration, it is essential only that the membrane devices be provided with two inlet and two exit ports for the supply and withdrawal of air and water streams from the respective sides of the membrane contained therein. Air and water flows through the module may either be countercurrent, crosscurrent, or cocurrent—although in principle the countercurrent flow configuration will have an advantage in radon removal efficiency at low air stripping flowrates. While the stripping air will normally flow only once through the device, water may either pass through the device on a once-through basis or, alternatively, it may be recirculated between the membrane module and one or more optional water storage tanks or accumulator vessels connected to the membrane stripping unit via a recirculation pump. The direction of water flow through the membrane module may be reversed during certain portions of the operating cycle of such recirculation-and-storage systems, so that the water inlet of the module becomes the water outlet and vice versa. A number of alternative systems and processes based on water recirculation can be envisioned which are within the scope and spirit of the present invention.

In yet another embodiment of the invention, where high degrees of waterborne radon removal are required, water that has been treated by membrane stripping to accomplish "bulk" radon removal may further be treated by passing the membrane effluent through a granulated activated carbon (GAC) or other type of carbon adsorption bed. By subjecting the water to this final "polish" filtration step, the level of residual waterborne radon can be further reduced to arbitrarily low and acceptable levels. In this hybrid membrane-stripping/carbon-adsorption system and method, the sizes of both the membrane stripping unit and of the carbon bed can be significantly reduced from what would be required in processes based on membrane stripping or carbon adsorption alone, and certain disadvantages of membrane stripping (e.g., high membrane cost) and of carbon adsorption (e.g., build-up of radioactivity on the carbon adsorbent) can be alleviated.

Membranes suitable for the practice of the present invention may be either porous or non-porous, and they may be fabricated from various materials in various morphologies, physical forms, and geometries. Two types of membranes that have been found by experiment (see Section 5.0 below) to be particularly useful are (i) dense, polymeric membranes comprised of silicone rubber and various of its copolymers (e.g., the block copolymer formed from polydimethylsiloxane and polycarbonate) and (ii) hydrophobic, microporous membranes prepared from such non-wetting polymers as polytetrafluoroethylene (PTFE) and polypropylene (PP). Porous membranes may be either isotropic (i.e., possessing substantially uniform-sized pores throughout the membrane matrix), or they may be asymmetric (i.e., exhibiting substantial variation in pore size across the thickness of the membrane). Nonporous or "dense" membranes may either be self-supporting or supported, with the so-called "composite" membranes consisting of a dense film residing atop and/or within a porous support membrane (usually prepared from a different material) being particularly advantageous.

The membrane stripping method and apparatus of the present invention provide a simple, compact, economical, quiet, and efficient means for the removal of dissolved radon gas from water that alleviates or eliminates many of the disadvantages of the prior-art aeration and carbon adsorption processes that have been used for this purpose in the past.

3.0. BRIEF DESCRIPTION OF THE FIGURES

Figure 9:
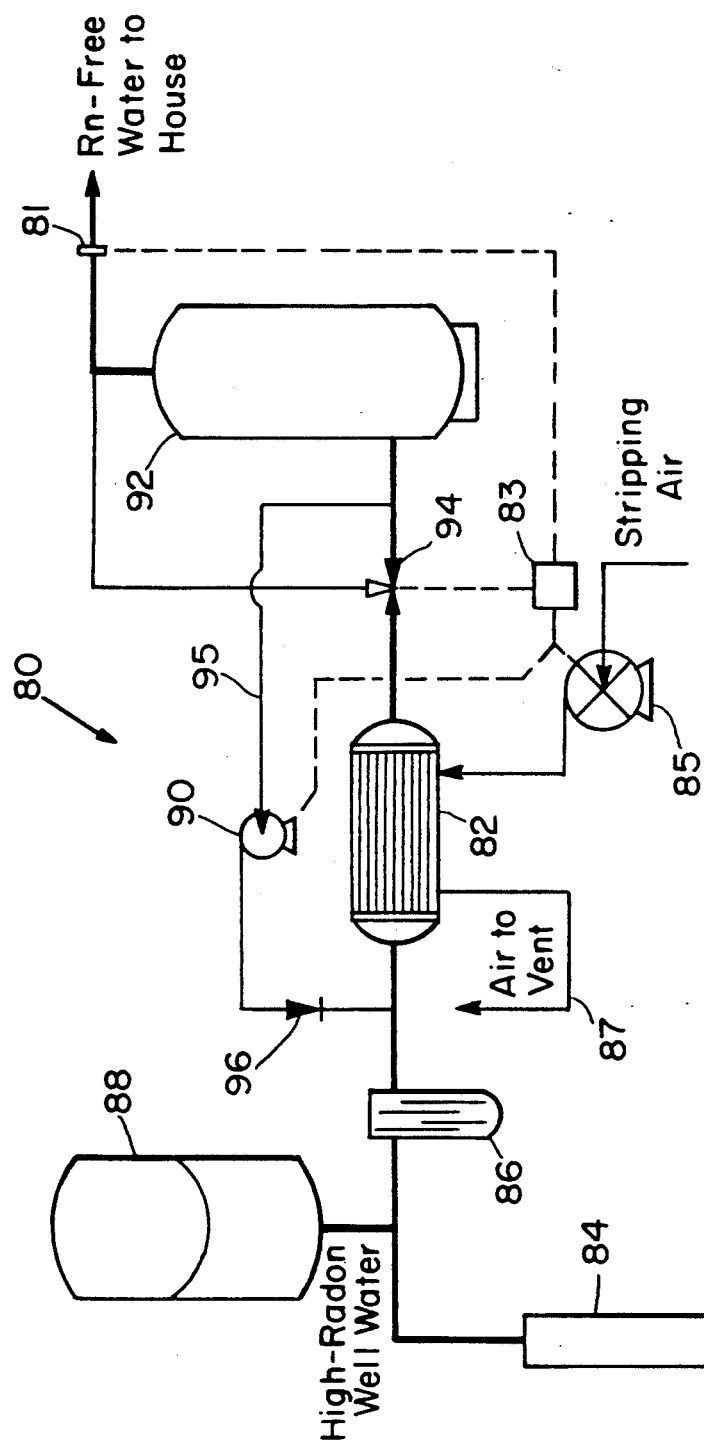

FIG. 9 is a schematic representation of another embodiment of the membrane stripping system of the present invention for removal of waterborne radon gas, illustrating the configuration of a system incorporating means for the recirculation of water between a membrane stripping module and a water storage vessel, showing the operation of the system during a period of water usage (with the flow of water being depicted by the heavier solid lines in the drawing and control circuitry being depicted by the dashed lines).

Figure 10:
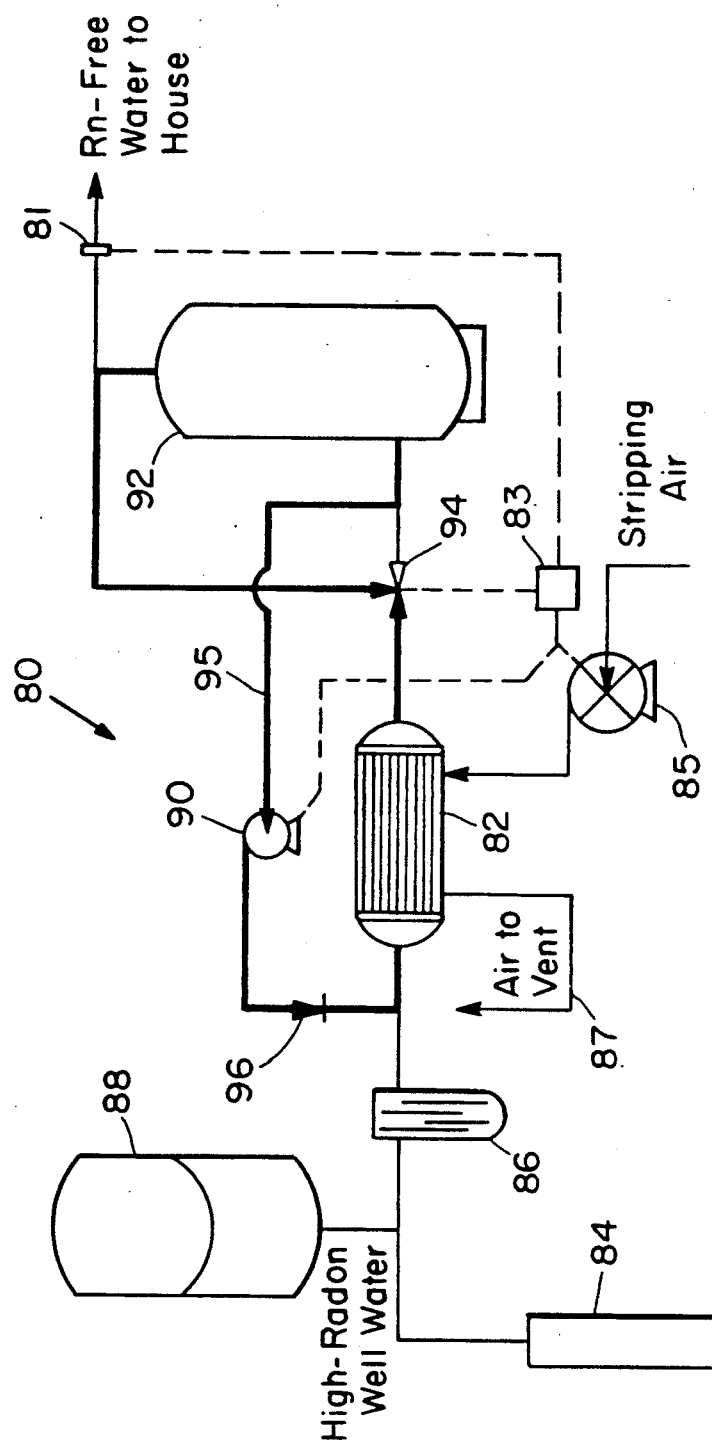

FIG. 10 is a schematic representation of the same membrane stripping system for removal of waterborne radon gas shown in FIG. 9 incorporating means for water recirculation and storage—except in this instance illustrating operation of the system during a portion of the duty cycle when water is being recirculated through the membrane stripping module and water storage vessel (again, with water flow being depicted by the heavier solid lines in the drawing).

Figure 11:
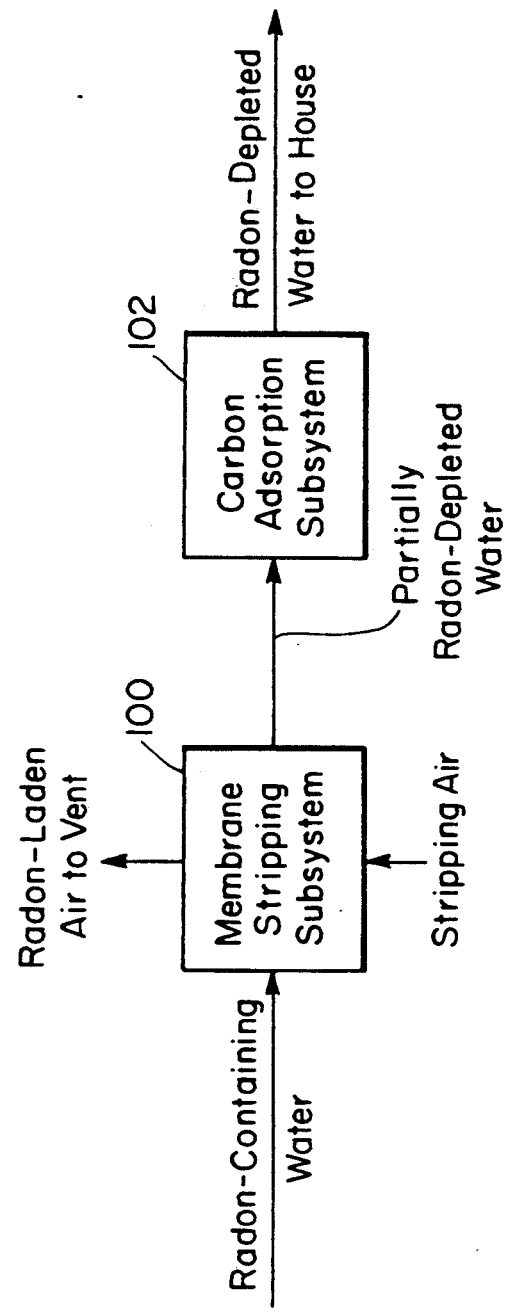

FIG. 11 is a schematic representation of a "hybrid" system for waterborne radon removal comprising a membrane stripping subsystem for bulk radon removal followed by a granulated activated carbon adsorption subsystem for further removal of dissolved radon gas.

Figure 12:
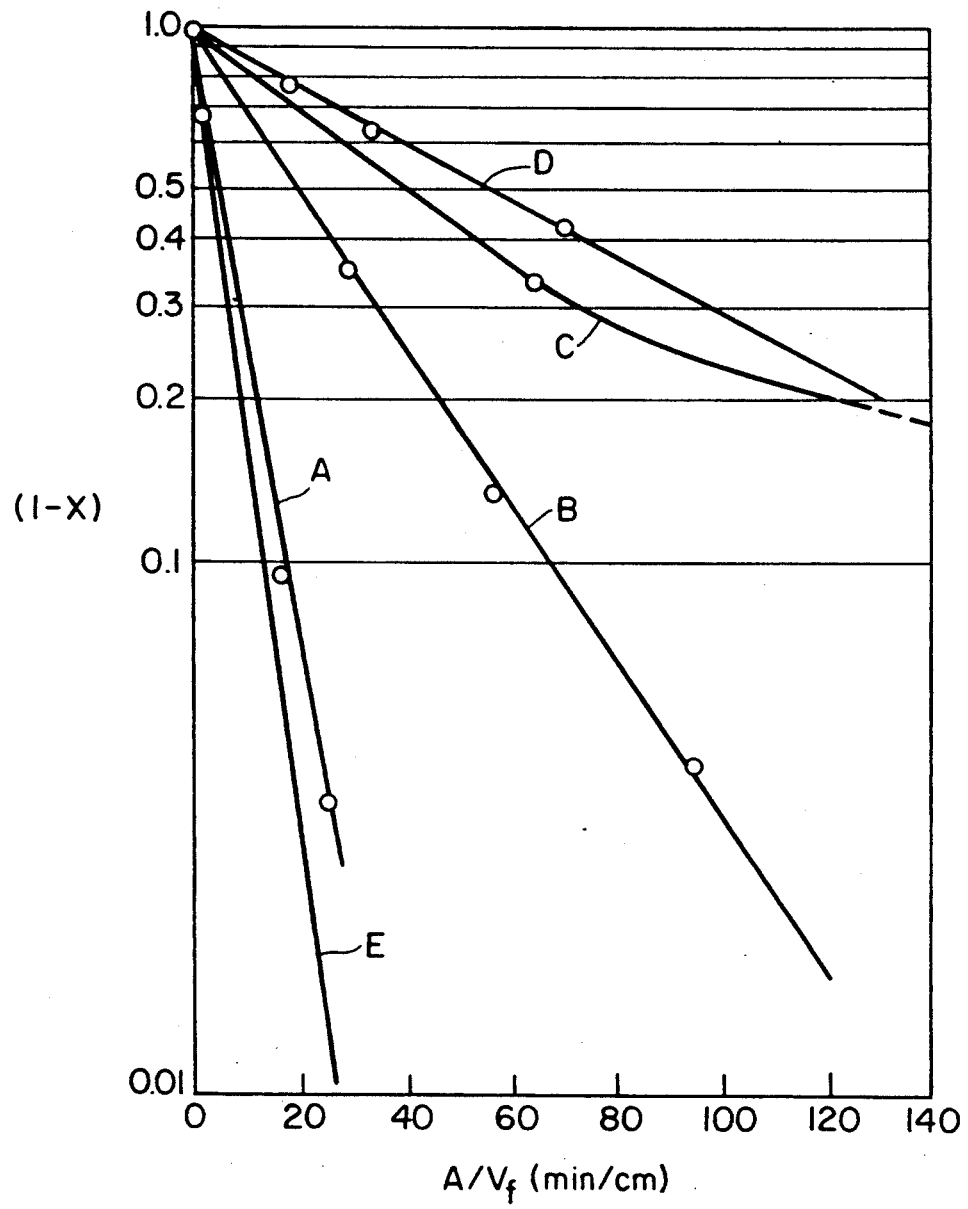

FIG. 12 is a semi-logarithmic plot relating the experimentally determined fractional degree of radon removed in a variety of membrane stripping modules to the membrane areas in those modules and to the flow-rate of water being treated.

4.0. DETAILED DESCRIPTION OF THE INVENTION

4.1. SYSTEM DESIGN CONSIDERATIONS

4.1.1. The Membrane Stripping Concept for Radon Removal

Figure 2:
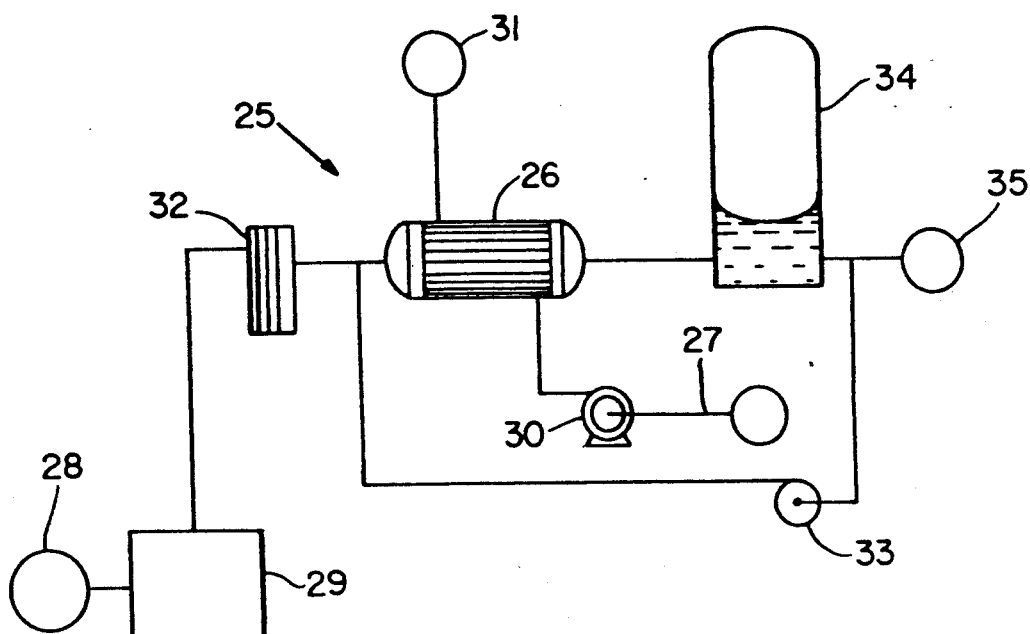
FIG. 2 is a schematic representation of one embodiment of the membrane stripping system of the present invention for the removal of waterborne radon gas.

As introduced in Section 2.0, a membrane stripping system 25 suitable for removal of waterborne radon and attendant reduction of indoor air pollution levels is shown in FIG. 2. At its heart is a high-surface-area (e.g., hollow-fiber) membrane module 26 that contacts radon-rich groundwater with a stream of air 27 that serves to carry, by means of a vent 31, the permeated radon gas from the home. In the continuous process shown in the figure, groundwater 28 with a high radon concentration is supplied at a normal system pressure of approximately 10 to 100 psig (and more typically 20 top 80 psig) by the well pump 29; it generally maintains this pressure (except for a modest pressure drop across the membrane device) during its treatment and subsequent distribution within the home. Stripping air is supplied either from within the home or outside of it at a pressure only slightly above atmospheric pressure by a low-pressure and inexpensive fan or air blower 30 with minimal power consumption.

In some embodiments the system may optionally be provided with a water pretreatment means 32, which may consist of a cartridge filter for removal of sediments and particles or a unit for removal of dissolved iron. Also a recirculation circuit may optionally be provided incorporating a pump 33 and a hydropneumatic or other type of water storage tank 34. The tank 34 may be located between the membrane module 26 and the outlet 35 to the house for radon-free water as shown in FIG. 2, or the tank 34 may be located elsewhere in the water flow path.

Figure 1:
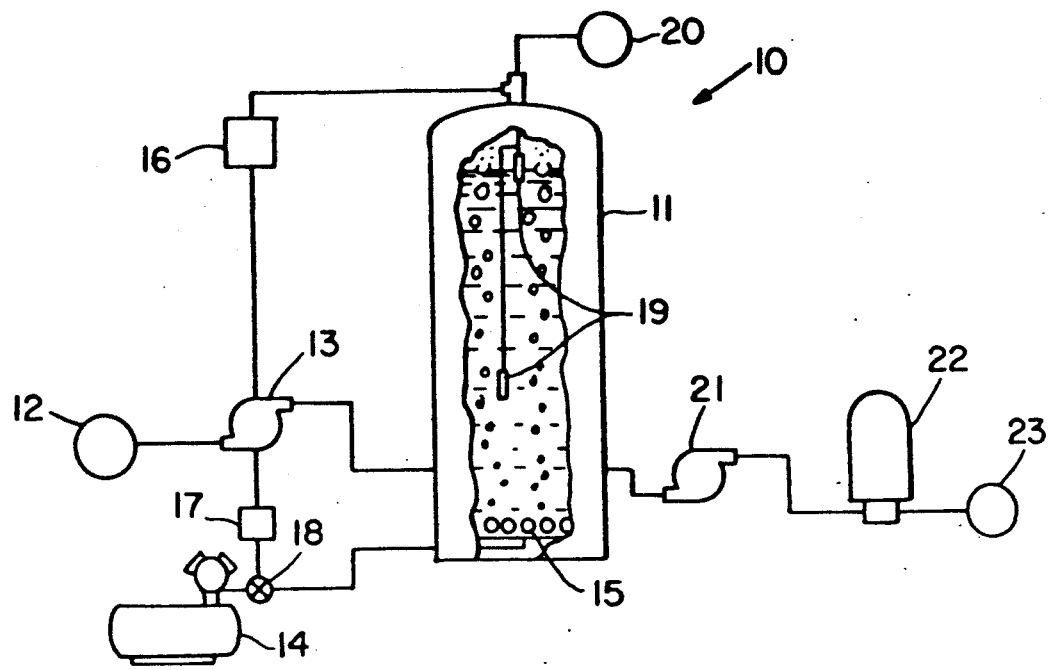
FIG. 1 is a schematic representation of a conventional diffused-bubble aeration system of the prior art for removal of dissolved radon gas from groundwater.

While the system is similar in operation to conventional diffused bubble aeration in some respects, it is strikingly different in others. For example, stripping air need not be supplied at a pressure sufficient to overcome the water head associated with an aeration tank (see FIG. 1), since in the process of the present invention water and air streams flow on opposite sides of a membrane. This phase-separating membrane serves to support any pressure difference applied across it, subject to limits associated with the mechanical strength of the membrane and by wettability considerations for microporous membranes as discussed further in Section 4.2.2 below. By the same token, the proposed system obviates the need for a second water pump as is required in conventional diffused bubble aeration systems to repressurize the treated water—i.e., to bring it up to the pressure required for its subsequent distribution in the home. Moreover, relatively low air flowrates suffice in a membrane-mediated stripping process as compared to those employed in diffused bubble aeration processes of the prior art where both the air/water interfacial area and the radon mass transfer coefficient have been shown to be strongly dependent on stripping air flowrate (Lowry, J. D. et al., J. Am. Water Works Assoc., 79:4 (1987) 162-169). In contrast, the amount of membrane packaged in the membrane device determines the effective interfacial contact area in a membrane stripping system, and both this area and the overall radon mass transfer coefficient are quite insensitive to the flowrate of stripping air employed.

4.1.2. Flux and System Design Equations

The basic equation describing the transmembrane radon flux from water to stripping air is given by $$N = K_l(C_l - K_{eq}C_g)[=]\text{g-mol/cm}^2\text{-sec} \quad (2)$$

where $K_l$(cm/sec) is an overall mass transfer coefficient based on liquid-phase concentrations, $C_l$ and $C_g$ are liquid- and gas-phase radon concentrations expressed in g-mols/cm$^3$ and $K_{eq}$ is a dimensionless radon partition coefficient defined as $$K_{eq} = (C_l)_{eq}/(C_g)_{eq} \quad (3)$$

The term $(C_l - K_{eq}C_g)$ in equation (2) describes the overall radon concentration difference that is responsible for transport of this gas from water to air. The term $K_{eq}C_g$ may be thought of as a "back-pressure" term which acts to reduce this overall concentration difference; it is simply the concentration of radon in water in local equilibrium with the stripping air in contact with the opposite membrane surface at any point in the membrane stripping device. The equilibrium constant of equation (3) is simply the "coefficient of solubility"; it can be related to the Henry's law constant "m" of equation (1) by the expression $$K_{eq} = C_l R T/m \quad (4)$$

where $C_l$ is the concentration of liquid water (0.055 g-mols/cm$^3$).

The design of a membrane stripper for removal of waterborne radon is simplified by the facts that (i) $K_{eq}$ is only about 0.25 and that (ii) the typical gas-phase radon concentrations ($C_g$) of several to tens of pCi/L that will be encountered when indoor stripping air is employed will typically be several orders of magnitude lower than the liquid-phase Rn concentration $C_l$ found in the water undergoing treatment (e.g., usually at least several thousand pCi/L). In instances where outside air is employed in the membrane stripping process, this gaseous radon concentration $C_g$ will be even lower still, given that the average radon concentration in outside air is about 0.05 pCi/L. Accordingly, relatively low volumetric flowrates of stripping air—even if supplied from inside the home (e.g., the basement where the water tank is typically located) as opposed to from outside the home—will suffice to efficiently carry off the stripped radon gas.

At conditions where the "back-pressure" term in equation (2) is usually insignificant, the flux equation can generally be simplified as follows:

$$N = K_l C_l [=]\text{g-mol/cm}^2\text{-sec} \quad (5)$$

It remains to evaluate the overall liquid-phase mass transfer coefficient $K_l$ (Yang, M. -C. and E. L. Cussler, AIChE J., 32 (1986) 1910-1916; Yang, M. -C. and E. L. Cussler, J. Memb. Sci., 42 (1989) 273-284; Tang, T. E. and S. -T. Hwang, AIChE J., 22 (1976) 1000-1006; Cote, P., J. L. Bersillon and A. Huyard, J. Memb. Sci., 47 (1989) 91-106; Zhang, Q. and E. L. Cussler, J. Memb. Sci., 23 (1985) 321). The corresponding overall resistance ($1/K_l$) may be viewed as the sum of the individual aqueous-phase, membrane, and gas-phase resistances:

$$1/K_l = (1/k_l) + (1/k_m) + (K_{eq}/k_g) \quad (6)$$

where $k_l$ and $k_g$ are the individual liquid- and gas-phase mass transfer coefficients in cm/sec and $k_m$ is an effective membrane permeability.

In stripping a volatile gas such as Rn from a water, the air-phase resistance is typically negligible. [In the present case, the dimensionless stripping factor "$m \cdot k_g/k_l$" is of order 30,000, attesting to the fact that the liquid-phase mass transfer resistance is "controlling" (i.e., that the liquid-phase diffusional resistance dominates over that afforded by the gas phase).] It is critical to achievement of suitably high radon stripping rates that the membrane resistance $1/k_m$ also be acceptably small, since the required membrane area will vary inversely with the overall mass transport coefficient $K_l$ which is dependent upon it. Ideally, the aqueous-phase mass transfer resistance will be minimized by optimal membrane stripping device design, and the membrane transport resistance will be made negligible compared to the aqueous-phase resistance by choice of the proper membrane.

The membrane stripping module can be sized by integration of the following differential mass balance equation:

$$V_f(dC_l/dA) = -N \quad (7)$$

where $V_f$ is the volumetric water feed flowrate (cm³/sec), dA is the differential membrane contactor area (cm²), and N is the Rn flux. Substitution for N and integration yields the following expression relating inlet and outlet aqueous-phase radon concentrations to water flowrate, overall mass transfer coefficient, and membrane contactor area:

$$\ln(C_{l,in}/C_{l,out}) = K_l A/V_f \quad (8)$$

Thus, the fractional removal "X" of waterborne radon that can be accomplished in a single pass through the membrane stripping device is given by the equation $$X = 1 - \exp[-K_l A/V_f] \quad (9)$$

This is the critical device design equation which is useful in the specification of the membrane area required in a given waterborne radon removal application (see also Section 4.3).

Both hydrophobic microporous membranes and dense polymeric ones are potentially suitable for stripping radon from water, as discussed in considerable detail in Section 4.2. For now, we turn to the matter of the typical magnitude of the aqueous-phase mass transfer coefficient $k_l$ that may be expected to describe this important step in the overall process of radon transport from water to stripping air.

4.1.3. Typical Aqueous-Phase Mass Transfer Coefficients

Under certain circumstances (i.e., with proper membrane selection), both the gas-phase and membrane-phase mass transfer resistances can be negligible as compared to the aqueous-phase "boundary layer" resistance to radon transport. In this situation, the overall mass transfer coefficient $K_l$ will be closely approximated by the individual aqueous-phase coefficient $k_l$. In any event, the overall coefficient will be strongly dependent on the aqueous-phase coefficient through equation (6) above.

Because of the central importance of $k_l$ to the performance and size of a membrane stripper, the present section is devoted to survey of mass transfer correlations with which this coefficient can be estimated for a wide range of membrane device configurations and operating conditions. In Section 5.0, experimental measurements of the overall radon transport coefficient $K_l$ are provided for selected types of membranes and module designs.

To first order, $k_l$ may be expressed as a ratio of the molecular diffusivity of dissolved radon gas in water (estimated using the Wilke-Chang equation to be $1.4 \times 10^{-5}$ cm²/sec at 20° C.) to an effective boundary layer thickness which is dependent on flow velocity, hollow-fiber or flow-channel dimensions, and the direction of water flow past the membrane surface. For example, the assumption of a 50 micron effective boundary layer thickness yields an estimated value for the liquid-phase Rn mass transfer coefficient of 0.0028 cm/sec. More rigorous theoretical analyses yield correlations of a dimensionless Sherwood number (Sh) as a function of a dimensionless Reynolds number (denoted as Re, which describe the ratio of inertial forces to viscous forces acting on a fluid element) and a dimensionless Schmidt number (Sc, suggestive of the relative importance of viscous and diffusive effects). The Sherwood number, which is directly proportional to the aqueous-phase mass transfer coefficient $K_l$, is defined as $$Sh = (k_l d/D) \quad (10)$$

while the Reynolds and Schmidt numbers take the forms $$Re = d V_l/\mu \text{ and } Sc = \mu/D \quad (11)$$

where "d" is the inner diameter of the flow conduit (i.e., the hollow fiber diameter in centimeters), $V_l$ is a representative fluid velocity (cm/sec), "$\mu$" is the kinematic viscosity of the fluid (i.e., water in this case, about 0.01 cm²/sec), and "D" is the molecular diffusivity of the solute in the fluid (i.e., of Rn in water, in units of cm²/sec). In cases where the fluid is directed through a flow channel which is not cylindrical (i.e., flow outside hollow fibers or within the channels of a spiral-wound flat-sheet membrane module), it is common to use an equivalent or "hydraulic" diameter $d_h$ in place of "d" in equation (10), where this hydraulic diameter is defined as follows:

$$d_h = 4 \, [(\text{cross-sectional area})/(\text{wetted perimeter})] \quad (12)$$

(This expression reduces to the inner diameter "d" for the case of flow down the bore or lumen of a hollow-fiber membrane.)

Sherwood number correlations useful in the estimation of $k_l$ generally take the following form:

$$Sh = a \, Re^x Sc^y \quad (13)$$

where "a" is a proportionality constant and "x" and "y" are exponents that describe the sensitivity of the Sherwood number to the Reynolds and Schmidt numbers. A particular Sherwood number correlation that is especially useful in describing mass transfer in membrane devices is given by the expressions $$Sh = 1.38 Re^{0.34} Sc^{0.33} \quad (14)$$

$$(k_l d/D) = 1.38 (d \, V_l/\mu)^{0.34} (\mu/D)^{0.33} \quad (15)$$

Obviously, higher flow velocities and smaller fiber dimensions produce higher mass transfer coefficients, but this improvement is gained at the expense of aggravating water-side pressure drops. (Among other things, this suggests the adoption of relatively stubby membrane modules to keep pressure drops to a few psi.)

Neither calculated nor experimental values for the aqueous-phase mass transfer coefficient of radon have previously appeared in the published literature. However, there are many such values given for more generally encountered solutes—especially, oxygen. Liquid-phase coefficients for oxygen and other small solutes appear, for example, in the above-cited papers by Cussler and by Cote et al.; several of these are summarized in Table I below for oxygen transport in devices based on hollow-fiber membranes and various flow configurations.

It can be seen from the data and calculations for $O_2$ reported in Table I that values for this gas' mass transfer coefficient $k_l$ as low as 0.0014 and as high as 0.015–0.050 cm/sec are anticipated for various fiber/module designs and flow velocities, and even higher mass transfer coefficients can be realized with more sophistocated membrane module designs. Moreover, while the mass transfer coefficients of Table I are for oxygen gas, they are indicative of the size of the $k_l$ values that might be expected for dissolved radon gas as well. In this regard, it should be noted that $k_l$ varies with the $\frac{2}{3}$ power of diffusivity. Thus, it should be anticipated that $k_l$ values for radon gas should be about 80% of those calculated or measured for $O_2$ at equivalent conditions—i.e., from about 0.001 to about 0.04 cm/sec.

It is instructive to compare these predicted aqueous-phase mass transfer coefficients for radon gas with calculated and/or experimentally measured membrane-phase ($k_m$) or overall ($K_l$) mass transfer coefficients as reported in Sections 4.2 and 5.0 below.

TABLE I

EXPERIMENTAL & ESTIMATED WATER-SIDE MASS TRANSFER COEFFICIENTS FOR OXYGEN

| Configuration | $V_l$ (cm/sec) | Re | Dia. (um) | $k_l$ (cm/sec) | Ref. |
|---|---|---|---|---|---|
| outside, crossflow | 10 | — | 100 | 0.050 | 1 |
| outside, parallel | 10 | — | 100 | 0.01 | 1 |
| inside, axial | 10 | — | 100 | 0.005 | 1 |
| outside, crossflow | 4.2 | — | 250 (OD) | 0.015 | 2 |
| inside, axial | 50. | — | 200 (ID) | 0.0055 | 2 |
| inside, axial | — | 0.6 | 305 (ID) | 0.0014 | 3 |
| inside, axial | — | 49.0 | 305 (ID) | 0.0059 | 3 |

Ref. 1 Yang, M. C. and E. L. Cussler, AIChE J., 32 (1986) 1910–1916.
Ref. 2 Yang, M. C. and E. L. Cussler, J. Memb. Sci., 42 (1989) 273–284.
Ref. 3 Cote, P., J. L. Bersillon and A. Huyard, J. Memb. Sci., 47 (1989) 91–106.

4.2. SUITABLE MEMBRANE TYPES

In principle, three different types of radon-permeable, phase-separating/contacting membranes will have utility in the practice of the present invention:

(i) dense or nonporous membranes of various polymer compositions—typically rubbers, but preferably silicone rubber (e.g., polydimethylsiloxane or PDMS) and certain of its solvent-castable copolymers (e.g., the block copolymer of PDMS and bisphenol-A polycarbonate);

(ii) microporous membranes, preferably hydrophobic ones comprised typically of PTFE or PP that will resist wetting by the water stream undergoing treatment; and (iii) immobilized liquid membranes (ILMs) consisting of various water-immiscible silicone fluids immobilized by capillarity within the pores of microporous support films.

Each of these types of membranes and conditions for their use in the practice of the invention are described in Sections 4.2.1 to 4.2.3 below.

4.2.1. Nonporous or "Dense" Polymeric Films

Figure 3:
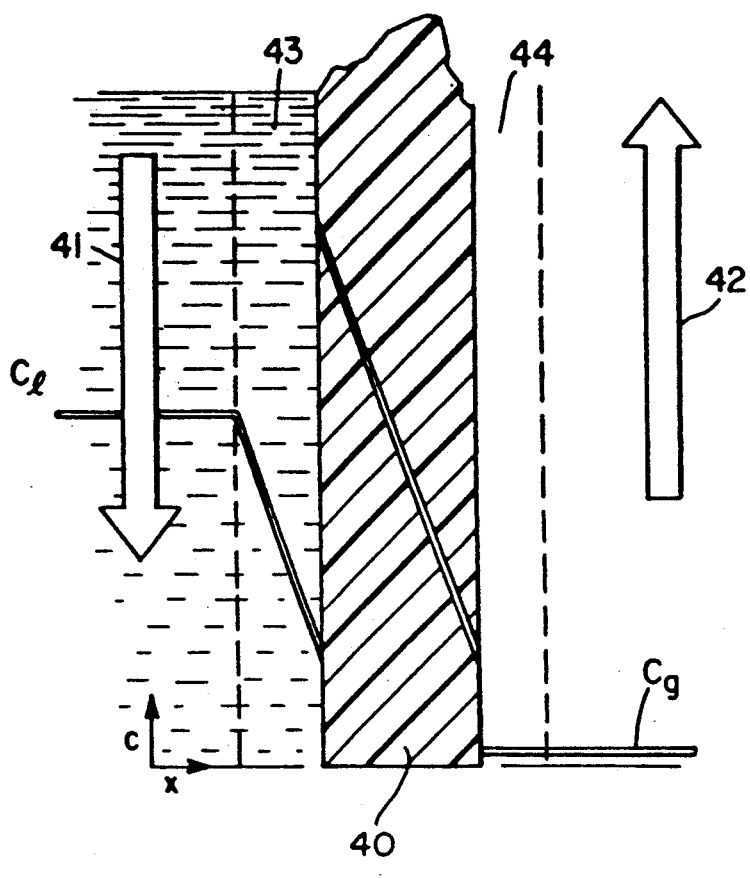
FIG. 3 is a cross-sectional view of a dense membrane (e.g., polydimethylsiloxane rubber or one of its copolymers) illustrating the various steps involved in the transport of radon-222 from the water being treated to the stripping air stream.

FIG. 3 is a cross-sectional view of a dense membrane (e.g., dimethylsiloxane rubber, one of its copolymers, or some other suitable radon-permeable polymer) illustrating the various steps involved in the transport of radon-222 from the water 41 being treated to the stripping air stream 42.

The reduction of the bulk water concentration $C_l$ of radon is reduced by the steps of: diffusion of radon across the aqueous-phase boundary layer 43 (or "stagnant film"), partitioning of radon into the membrane 40, diffusion across the membrane, partitioning of radon into the air stripping stream through the "stagnant air film" 44 (which typically affords only a small transfer resistance), and diffusion into the bulk air stream 42 at a concentration $C_g$.

Nonporous membranes (also referred to as "dense" membranes) are typically comprised of polymeric compositions that are extruded, blown, coated, or cast into the form of thin films, flat sheets, tubes, or fibers by a variety of fabrication techniques that are well known in the art of membrane technology (Lonsdale, H. K., J. Memb. Sci., 10 (1982) 81–181; Lee, E. K., "Synthetic Membranes, Applications," Encyclopedia of Physical Science and Technology, 8 (1987) 20–55). Nonporous membranes clearly possess the characteristic essential to the operability of the present invention of their being impervious to the pressure-driven bulk flow of air and water from one membrane surface to the other. Even when a substantial pressure difference is applied in either direction across such nonporous membranes, there will be established only a relatively minor diffusive permeation of water vapor and/or of the air gases across suitably nonporous membranes; convective flow of water and/or air will not occur so long as the applied pressure difference is not so great as to cause mechanical rupture of the film. Note that while dense membranes are capable of being operated with either the water or the air stream at the higher pressure, it will generally be preferred to have the water at the higher pressure and to use near-atmospheric-pressure air in the stripping process.

Whether a particular nonporous polymeric film will be well suited for use in the process of the present invention will thus depend primarily on its diffusive permeability to radon gas originating from the water undergoing treatment, as well as on the effective thickness of the polymeric membrane. It is generally recognized that transport of gases through nonporous polymeric membranes occurs by a solution-diffusion mechanism. A gas present on one side of a membrane first dissolves into the polymeric film, diffuses down its concentration gradient to the lower-partial-pressure side of the membrane, and then desorbs. Under ideal circumstances (e.g., applicability of Henry's Law), the permeability (P) of a membrane is given by the product of the molecular diffusivity (D) and solubility (S) of the gas in the membrane material.

Permeability is a extraordinarily complex function of the nature of the diffusing gas (e.g., molecular dimensions, condensability), etc.), properties of the polymer (e.g., rubbery or glassy, amorphous or crystalline, and its processing history) and the nature of the physicochemical interaction between the permeating gas and the polymer, among other things. Thus, it is perhaps not surprising that there is, as of yet, no satisfactory theoretical approach or methodology by which the permeability of a particular polymer to a specific gas can be predicted from first principles with much of any confidence—even at ideal conditions of low permeant partial pressure, with the polymer in its "equilibrium" state, and in the absence of other components capable of interacting with the membrane matrix and other diffusing components (Lee, E. K., "Synthetic Membranes, Applications," Encyclopedia of Physical Science and Technology, 8 (1987) 20–55; Matson, S. L., J. Lopez and J. A. Quinn, Chem. Eng. Sci., 38 (1983) 503–524; Chern, R. T., W. J. Koros, H. B. Hopfenberg and V. T. Stannett, "Material Selection for Membrane-Based Gas Separations," pp. 25–46 in *Materials Science of Synthetic Membranes*, D. R. Lloyd, ed., ACS Symp. Ser. 269, American Chemical Society, New York, 1985).

What can be said about the prediction of gas/membrane permeabilities amounts to generalizations of various sorts. For instance, rubbery polymers (i.e., polymers used at temperatures above their glass transition temperatures, $T > T_g$) are generally known to be more permeable than are glassy polymers (for which $T < T_g$). Moreover, amorphous polymers are usually more permeable than crystalline ones. However, the situation vis-a-vis the effect of the nature of particular permeants is somewhat more complicated and even less predictable. For instance, many very small gas molecules (e.g., $H_2$ and $He$) exhibit high permeabilities in many polymeric materials as a consequence of their small size and thus their relatively large mobility or diffusivity in the polymer matrix. At the same time, however, certain relatively large permeants (e.g., $CO_2$)—and especially condensible vapors such as $H_2O$ and organic solvents—exhibit relatively large permeabilities in spite of their size because they are highly condensable and soluble in certain membrane polymers. For molecules of intermediate size, it is more difficult to generalize since the effects of molecular size on permeant mobility and solubility are in opposition to one another, and the existence of specific permeant/polymer interactions cannot safely be ignored.

It can be seen from the above that values for the permeation coefficients "Pr" of gases in polymeric membranes must generally be measured experimentally. A number of standard methods and apparatus for the measurement of gas permeabilities are known in the art. In many cases, such measurements are made by mounting a sample of the membrane material (e.g., a flat sheet) in a gas-tight permeation cell of a convenient size, and then applying a high pressure of the gas of interest to the feed-side compartment of the test cell; sometimes a vacuum is maintained on the permeate side of the cell. The rate of gas permeation into the low-pressure compartment is determined by measuring upstream and/or downstream compartments (e.g., by capacitance manometry), by determining the flow of permeating gas if the downstream compartment of the test cell is at atmospheric pressure (e.g., with a soap bubble or other type of flowmeter), or by other like procedures. The standard unit of gas permeability is the Barrer, defined as the ratio of the gas flux [in units of $cm^3(STP)/cm^2$-sec)] to the gradient in partial pressure of the permeating gas maintained across the membrane (in units of cm Hg/cm):

$$1 \text{ Barrer} = 10^{-10} cm^3(STP)\text{-}cm/cm^2\text{-sec-cmHg}$$

(Note that for rather obscure historical reasons, it is also quite common to find permeability coefficients reported in units of $10^{-9}$ $cm^3$-$cm/cm^2$-sec-cmHg, and still other units are occasionally employed.) We further note that the permeability "Pr" may also be expressed in terms of an effective membrane diffusivity "$D_m$" ($cm^2/sec$) by means of the equation $$D_m = 76 \text{ Pr} \qquad (16)$$

The membrane's mass transfer coefficient $k_m$ [see Section 4.1.2 above] may then be calculated as the ratio of this membrane diffusivity to the membrane's effective thickness "L" as summarized by the expression $$k_m = D_m/L \qquad (17)$$

As discussed above, the reciprocal of this membrane-phase mass transfer coefficient provides a measure of the resistance to overall radon transport which is contributed by the process of membrane permeation.

It may be anticipated that a large number of nonporous polymeric films will not be applicable in the present membrane stripping invention for waterborne radon removal for the reason that their mass transfer resistance will be excessive—that is, their permeability to radon will be lower than desired for the economical practice of the present invention. Generally speaking, rubbery polymers can be expected to exhibit higher radon permeation coefficients than will glassy polymers, but it is also true that thin membranes are more readily fashioned, as a rule, from glassy polymers.

The permeabilities of various nonporous membranes to radon have been measured in several instances—generally in the context of their potential use as barrier films or as elements in track-etch detectors for the measurement of Rn-222 in the presence of "thoron". In the latter application, the membranes serve to pass radon-222 gas while selectively holding back another radon isotope—namely, "thoron" or radon-220. [These membranes are effective barriers for thoron because thoron's radioactive half-life (56 seconds) is short compared to the time constant for transmembrane diffusion, and most of the thoron decays to non-volatile daughters before it can emerge from the membrane. Accordingly, it is only the Rn-222 isotope—which has a half-life of 3.5 days—that is sensed by the track-etch detector.]

Accordingly, several publications report measurements of the radon permeability of several types of "anti-thoron" membranes (Bigu, J., Nucl. Insts. Meths. in Phys. Res., A251 (1986) 366–373; Hafez, A. -F. and G. Somogyi, Nuclear Tracks, 12 (1986) 697–700; Ramachandran, T. V., B. Y. Lalit and U. C. Mishra, Nucl. Tracks Radiat. Meas., 13 (1987) 81–84; Jha, G., M. Raghavayya and N. Padmanabhan, Health Physics, 42 (1982) 723–725). In most cases, the permeability of Rn has been expressed in terms of its effective diffusivity $D_m$ in the membrane [see equation (16)]. Various membrane polymers for which Rn permeability coefficients have been reported include "rubber" (type unspecified), natural rubber, polyamide, mylar, PVC, cellulosics, polyesters, polycarbonate, polyethylene, a "phenoxy" polymer, and finally a membrane identified only functionally (as opposed to chemically) as an "anti-thoron membrane."

Most of the cited polymers are relatively impermeable to Rn; while they are conceivably of interest as barriers to radon transport in other contexts, they would not be preferred for use in the present invention for the reason that their radon throughput is limited. Among the limited number of polymer compositions for which radon permeabilities have been reported, natural rubber exhibits the highest coefficient with a $D_m$ value of $6.36 \times 10^{-6}$ $cm^2/sec$. (Many polymers exhibit values which are lower than this by one to several orders of magnitude.) Having said this, however, it should be noted that natural rubber has the limitation of being particularly difficult to fabricate into the form of a thin membrane.

Typically, nonporous membranes useful in the practice of the present invention will be characterized by effective membrane diffusivities towards radon of at least about $10^{-7}$ cm$^2$/sec, and preferably at least about $10^{-6}$ cm$^2$/sec. Particularly preferred will be membranes with $D_m$ values for radon of order $10^{-5}$ cm$^2$/sec.

The permeability of radon in dimethyl silicone rubber has been estimated by the present invention by extrapolating the permeability values measured for the other noble gases. Measured permeabilities of silicone rubber to helium, argon, krypton, and xenon (Robb, W. L., U.S. Pat. No. 3,274,750, September 1966; "General Electric Permselective Membranes," product brief, GE Membrane Product Operation, Schenectady, N.Y.; Ohno, M. et al., Radiochem. Radioanal. Letters, 27 (1976) 299-306) are shown in Table II, along with values for permeant molecular weight and the Lennard-Jones parameter $\epsilon/k$.

TABLE II

ESTIMATION OF THE PERMEABILITY OF SILICONE RUBBER TO RADON GAS

| Noble Gas | Molecular Weight | Lennard-Jones Parameter $\epsilon/k$ (K) | Permeability × 10$^9$ (cm$^3$-cm/sec-cm$^2$-cmHg) |
|---|---|---|---|
| He | 4.0 | 10.2 | 35.5 |
| Ar | 40.0 | 93.3 | 61.3 |
| Kr | 83.8 | 209.4 | 98 |
| Xe | 131.3 | 231 | 203 |
| Rn | 222. | 377* | 650** |

*Estimated from critical temperature correlation
**Extrapolated from semilog plots of permeability vs. MW and $\epsilon/k$ By extrapolation of the log of permeability vs. the Lennard-Jones parameter on semilog coordinates we estimate a value for silicone rubber's Rn permeability of about $650 \times 10^{-9}$ cm$^3$(STP)-cm/sec-cm$^2$-cmHg.

However, in view of the above-cited severe limitations of the theory involved in predicting gas permeabilities and the many exceptions to the general rules and correlations that have been proposed, there is no substitute for experimental measurements. In our experiments presented as the Examples of Section 5.0, we have discovered that silicone rubber and certain of its copolymers are particularly preferred for the practice of the present invention for the reason that such compositions possess a relatively unique combination of desirable properties. More specifically, members of this family of polymers both (i) exhibit extraordinarily high permeabilities to radon gas and (ii) possess the further attractive feature of being amenable to fabrication into thin membranes of various types. While it has previously been suggested that certain silicone-containing polymers might be expected to give permeability-to-flux ratios appropriate to their use as anti-thoron barriers in track-etch detectors (Ward, W. J., et. al., Rev. Sci. Instrum., 48 (1977) 1440-1441; Ward, W. J., U.S. Pat. No. 4,064,436, December, 1977; Matson, S. L. et al., J. Memb. Sci., 29 (1986) 79-96), no direct measurement of the radon permeability of pure silicone or of silicone-based copolymer membranes has heretofore been made. (In this regard, it may be noted that it is the ratio of permeability to thickness—and not the absolute value of either parameter—which determines the utility of a particular membrane as an anti-thoron barrier.) Moreover, a membrane can be too thin and/or too permeable to function as an effective thoron (Rn-220) barrier, since the function of the latter is to impede the passage of thoron sufficiently such that it undergoes radioactive decay before emergence from the thoron barrier membrane.)

We have measured the overall mass transfer coefficients of two silicone-based membrane devices used for stripping radon from wellwater. As discussed further below, Example 1 of Section 5.0 reports results obtained with spiral-wound module containing a 76-micron-thick flat-sheet membrane prepared from pure polydimethylsiloxane rubber. Example 5 describes the fabrication of a composite hollow-fiber membrane module based on a silicone-containing composition—namely, a polydimethylsiloxane/polycarbonate block copolymer, and Example 6 reports its performance in its present application to waterborne radon removal. As summarized in Table X below, overall radon mass transfer coefficients $K_l$ of 0.00223 and 0.00277 cm/sec (0.134 and 0.166 cm/min) were measured for the two membrane devices of Examples 1 and 6, respectively. In the case of the membrane of Example 1 for which the effective membrane thickness is known, it is possible to calculate a lower limit for radon's effective diffusivity in the membrane of $1.7 \times 10^{-5}$ cm$^2$/sec (corresponding to an extraordinarily large Rn permeability for this silicone membrane of some 2240 Barrers). That these values of overall coefficients represent lower limits for the membrane coefficient (and permeability) stems from the fact that the aqueous-phase mass transfer resistance is also expected to be significant [see equation (6)].

It is instructive to compare these measured values of 0.00223 and 0.00227 cm/sec for the overall radon mass transfer coefficients of devices based on pure PDMS and PDMS/PC copolymer membranes with estimates of the aqueous-phase mass transfer coefficients provided in Section 4.1.3 (e.g., in Table I) for various flow and device configurations on the (dubious) assumption that the former values reflect only the membranes' mass transfer characteristics rather than that of the aqueous boundary layer at the conditions of our experiments. The conclusion which can be reached is that the resistance of silicone-based membranes can be small as compared to the aqueous boundary layer mass transfer resistance for certain device configurations and operating conditions. The resistance of such membranes will be a significant contributor to the overall mass transfer resistance only with relatively thick membranes and the most mass-transfer-efficient module designs that minimize aqueous-phase diffusional resistance.

In addition to their high radon permeability and relative ease of fabrication into the forms of membranes, another potential advantage of nonporous membranes such as the silicon-based polymers (e.g., siloxanes, alkoxysilanes, and aryloxysilanes) in the present application relates to a potential disadvantage of the porous types of membranes discussed below in Section 4.2.2. In particular, nonporous membranes are immune from the potential problem of long-term wetting that will be discussed in the context of microporous membranes used in the present invention, and nonporous membranes—especially silicone-based ones—are expected to be relatively fouling resistant in use, which is important given the premium which the application places on long-term, reliable, and unattended operation of the radon stripping system.

Modules containing pure polydimethylsiloxane rubber membranes are available from several commercial sources. They have been developed for use in such diverse applications as blood oxygenation and cell culture, and they are available in the form of tubes, spiral-wound flat-sheet modules, and hollow-fiber devices from such companies as Sci-Med Life Systems (Minneapolis, Minn.), CD Medical (Miami Lakes, Fla.), and others. A Sci-Med Model No. 0400-2A spiral-wound module was employed in Example 1 described in Section 5.0 below. In addition to the particular silicone rubber with dimethyl substituents on the backbone, a variety of differently substituted silicone rubbers and silane polymers (e.g., with such substituents as fluoro, phenyl, and variously substituted alkyl and aryl groups more generally ) are available and are expected to be useful in the present invention. In this regard, the extensive catalog distributed by Huls America (formerly Petrarch Systems, Inc. of Bristol, Pa.) and entitled *Silicon Compounds—Register and Review* provides an especially useful source of silicone-based elastomers and related compounds. A variety of curing systems (including room-temperature-vulcanizing or RTV silicone rubbers) will serve as the basis for useful silicone elastomers. Various silane polymers (e.g., polytrimethylvinylsilane and the like) have also been shown to be highly permeable to many gases, and while their selectivities are generally low, this is of little consequence in the present invention.

Silicone-rubber-based copolymers are particularly preferred as membrane materials in the present invention for the reasons that we have shown experimentally that they exhibit very high permeabilities to radon gas and they are solvent-castable and good film formers-—and thus are amenable to use in various membrane coating and casting operations. (The latter characteristics are important in the fabrication of composite membranes, for example.) The particular silicone-containing copolymer used in Examples 4 and 5 of Section 5.0 was obtained as a sample from the Membrane Products Operation of the General Electric Company (Schenectady, N.Y.); that company's designation for this material is "MEM-213." The material is known to consist of a block copolymer of polydimethylsiloxane (PDMS or "silicone rubber") and bisphenol-A polycarbonate (i.e., the material in General Electric's Lexan ® polymer). The dimethyl siloxane content of this material is about 55% by weight (45-46). These copolymers typically have from about ¼ to about ½ the permeability of pure silicone rubber to all gases including the noble gases (Matson, S. L., J. Lopez and J. A. Quinn, Chem. Eng. Sci., 38 (1983) 503-524; Matson, S. L. et al., J. Memb. Sci., 29 (1986) 79-96; Ward, W. J., W. R. Browall and S. G. Kimura, J. Memb. Sci., 1 (1976) 99).

Other commercial sources exist for chemically and functionally similar silicone/polycarbonate copolymers suitable for the preparation of membranes useful in the present invention—e.g., copolymers PS099 and PS099.5 available from Huls America/Petrarch Systems, Inc. (Bristol, Pa.) which contain 55-60% and 45-50% siloxane by weight, respectively. Still other silicon-based polymer compositions useful in the present invention are disclosed by Babcock et al. in U.S. Pat. No. 4,781,733.

Silicone rubber membranes can be prepared by any of several techniques well known in the art, including extrusion of hollow fibers or tubes through tube-in-orifice spinerettes and casting of flat sheets from the uncured (i.e., uncrosslinked) precursor or oligomer. Both supported and unsupported membranes will have utility in the application to waterborne radon removal.

Composite Membranes. In addition to the dense, homogeneous membranes described above, it is also the case that various composite membranes will be particularly useful in the present radon reduction method. These composite membranes, well known in the art, generally consist of dense films residing atop or within the pores of a microporous support membrane that will generally be prepared from some non-silicone-based polymer. Suitable porous support membranes may exhibit either the isotropic morphology characteristic of microfiltration (MF) membranes or the asymmetric or "skinned" morphology more typical of ultrafiltration (UF) membranes. Suitable porous support membranes ranging in thickness from about 0.5 to 5 mils (12 to 120 microns) may be prepared from such polymers as polysulfone, polyethersulfone, polyacrylonitrile and its copolymers, cellulose acetate, cellulose triacetate, cellulose butyrate, regenerated cellulose, polyvinylidene fluoride, polyetherimide, polyamide, polyethylene, polypropylene, polytetrafluoroethylene or nylon—so long as the membrane support material is physically and chemically compatible with the conditions of composite membrane fabrication.

Figure 4:
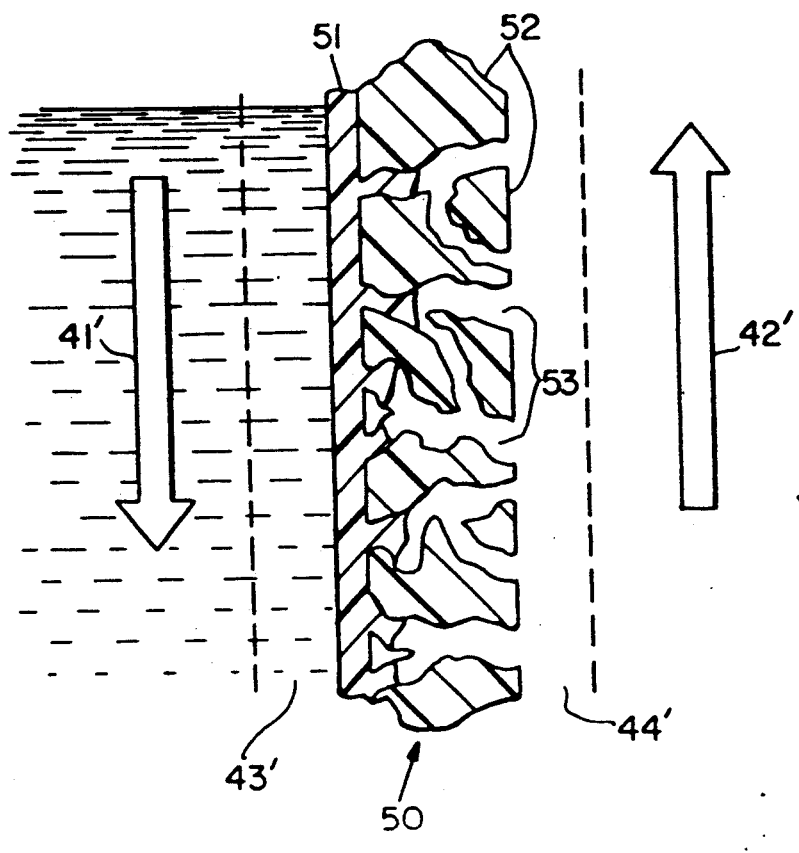
FIG. 4 is a cross-sectional view of a composite membrane (e.g., a film of dimethylsiloxane rubber or one of its copolymers supported atop and/or within a microporous support film) illustrating the various steps involved in the transport of radon-222 from the water being treated to the stripping air stream.

FIG. 4 is a cross-sectional view of a composite membrane 50 (e.g., a surface coating or film 51 of dimethylsiloxane rubber, one of its copolymers, or some other suitably Rn-permeable polymer supported atop and/or within a microporous support film 52 of a different matrix polymer) illustrating the various steps involved in the transport of radon-222 from the water 41' being treated to the stripping air stream 42'.

Again the radon diffuses across the aqueous boundary layer 43', partitions into the dense film 51, diffuses through the dense film (either directly to the stagnant gas film 44' if the dense polymer fills the micropores, or into air-filled pores 53 if the dense material only partially penetrates the pores as in FIG. 4), and is carried away by the stripping air stream 42'. Not shown but also within the scope of the present invention is the case wherein the polymer coating is located at the side of the membrane opposite to that in contact with the radon-containing water undergoing treatment.

Composite membranes may be prepared in a number of ways. Certain procedures rely on interfacial polymerization of a siloxane or silane-based polymer at one surface of a suitable support membrane. Similar interfacially polymerized thin-film-composite or "TFC" membranes prepared from polyamides are commonly used, for example, in reverse osmosis since extremely small effective membrane thicknesses can be attained with this procedure. However, much simpler composite membrane fabrication techniques based upon the coating of a solvent-castable silicone-containing polymer within or upon either surface of a porous support membrane serve equally well in the present invention, where the supported silicone-containing film obtained need not be particularly thin in order to yield an acceptably high transmembrane radon fluxes.

Along these lines, a preferred means of obtaining silicone-rubber-based composite membranes for use in this application involves the solvent casting of composite membranes from silicone/polycarbonate copolymers such as those available from General Electric (MEM-213) and Huls America/Petrarch Systems (PS099 and PS099.5) as discussed above. Water-based emulsions of silicone elastomers have also been found useful in coating microporous membrane substrates in "solvent-less" manufacturing methods, resulting in composite membranes useful in waterborne radon stripping. It can be estimated that supported films of these copolymers thinner than about 1 mil or 25 microns should exhibit very desirable Rn transport characteristics in the present application, and even greater thicknesses are acceptable in view of the results of Example 1 as presented in Section 5.0. Generally speaking in most other applications, it is desirable to limit the coating to one surface of the support membrane and thus to keep its thickness as small as possible to maximize flux. However, the permeability of radon gas through the silicone-based copolymers is sufficiently high that even through-coated membranes (i.e., porous membranes completely filled with the silicone rubber material) will be well suited to use in the process of the present invention.

A module-level fiber coating procedure similar to that employed in the fabrication of Monsanto's Prism membrane separators (which consist of silicone-on-polysulfone composite hollow fibers) may also be employed in the fabrication of suitable composite membranes (Henis, J. M. S. and M. K. Tripodi, Science, 220 (1983) 11–17; Henis, J. M. S. and M. K. Tripodi, U.S. Pat. No. 4,230,463). Alternatively, relatively exotic water-casting procedures available for the production of thin-film-composite membranes from silicone copolymers might be brought to bear, but the present application simply does not require this order of complexity. Particularly preferred as methods for composite membrane fabrication will be solution-casting procedures wherein a suitable organic solution of the desired copolymer (or silicone elastomer) is contacted with a suitably solvent resistant support and is thus deposited within and/or upon the support membrane. Evaporation of the solvent leaves behind a dense film of the radon-permeable membrane.

In Examples 4 and 5 of Section 5.0, we have employed asymmetric (i.e., UF-type) hollow fibers prepared from polyacrylonitrile (PAN) as supports for the silicone-polycarbonate copolymer membrane. This type of support membrane is available commercially in the form of 0.5 to 1.5 m² hemofiltration modules from Asahi Chemical, from Sepracor in the form of modules ranging in size from 0.75 to 50 m², and from other companies. Methylene chloride is a suitable solvent for the membrane coating operation. One of many coating protocols capable of yielding useful silicone-based composite membranes is discussed further in Example 5.

4.2.2. Microporous Membranes

In principle, either hydrophilic or hydrophobic microporous membranes may also be used in the process of the present invention to permit diffusive radon transport while simultaneously separating the aqueous and gaseous phases being brought into transmembrane contact. Phase separation (i.e., prevention of a pressure-driven flux of one of the bulk phases across the membrane) can be achieved by operating with a somewhat higher pressure maintained on that phase (i.e., either air or water) which does not wet the membrane. Thus, hydrophobic microporous membranes will be operated with the higher pressure on the water stream, since to do otherwise (i.e., to operated with an air-to-water pressure difference) would lead to the passage of air across the membrane and into the water stream. By the same token, hydrophilic microporous membranes are operated with the higher pressure of the stripping air stream in order to prevent an ultrafiltrative flux of water across the membrane.

Figure 5:
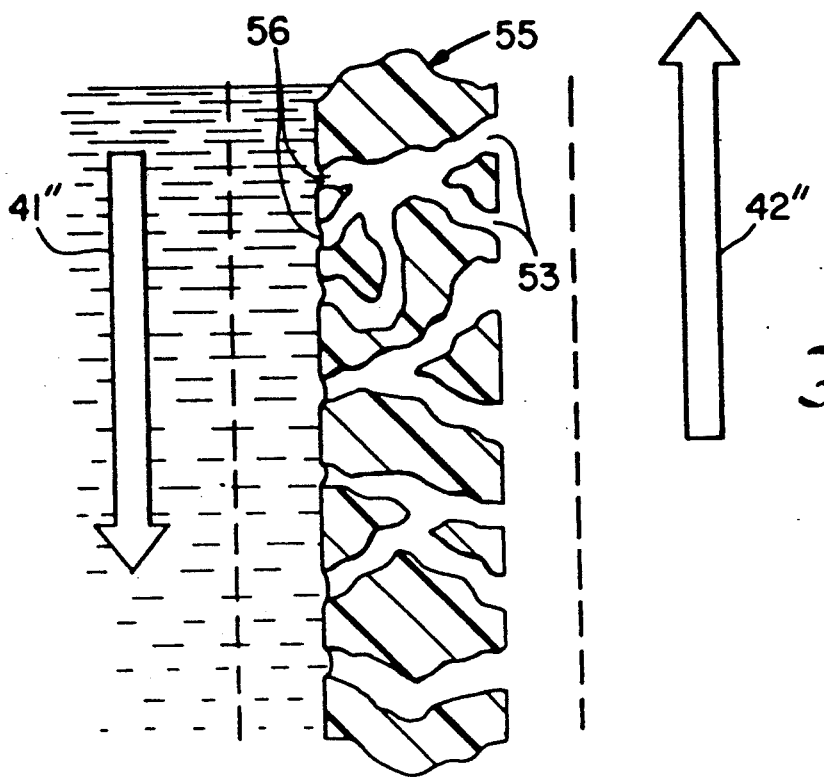
FIG. 5 is a cross-sectional view of a microporous, hydrophobic (i.e., non-wetted) membrane as used in the process of the present invention, illustrating the operating pressures and the various steps involved in the transport of radon-222 from the water being treated to the stripping air stream.

FIG. 5 is a cross-sectional view of a microporous, hydrophobic (i.e., non-water-wetted) membrane 55 as used in the process of the present invention, illustrating the operating pressures and the various steps involved in the transport of radon-222 from the water 41" being treated to the stripping air stream 42".

The transfer of radon from water to air takes place at the water/air interface 56 into an air-filled (non-wetted) pore 53, through the pore, and out into the air stream 42".

The water pressure P (41") is greater than the air pressure P (42").

Figure 6:
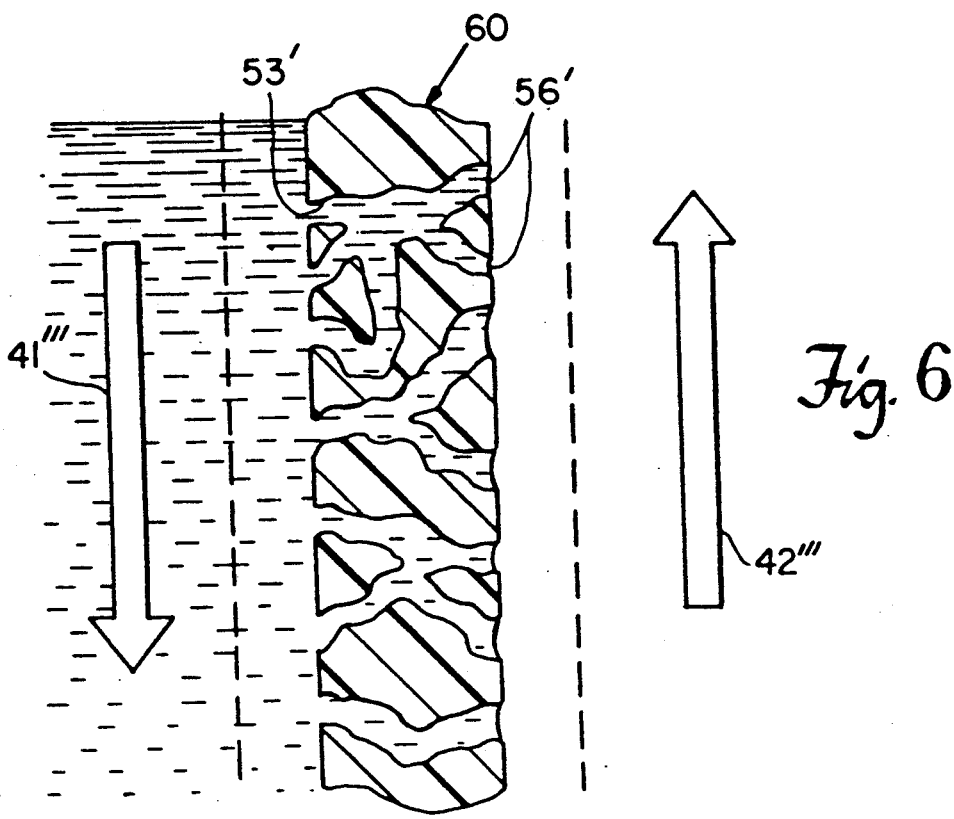
FIG. 6 is a cross-sectional view of a microporous, hydrophilic (i.e., wetted) membrane as used in the process of the present invention, illustrating the operating pressures and the various steps involved in the transport of radon-222 from the water being treated to the stripping air stream.

FIG. 6 is a cross-sectional view of a microporous, hydrophilic (i.e., water-wetted) membrane 60 as used in the process of the present invention, illustrating the operating pressures and the various steps involved in the transport of radon-222 from the water 41''' being treated to the stripping air stream 42'''. Now the water/air interface 56' is at the air side of the membrane and the pores 53' are water-filled.

The water pressure P (41''') is less than the air pressure P (42''').

Hydrophobic microporous membranes will ordinarily be preferred over hydrophilic ones for two reasons. First, the use of non-wetted hydrophobic membranes (wherein the pores are filled with air) avoids a significant mass transfer resistance incurred in the use of hydrophilic membranes. Specifically, diffusion of poorly soluble dissolved radon gas across the water that occupies the pores of a water-wetted hydrophilic membrane in use is a very slow process as compared to diffusion through the air which fills the pores of hydrophobic membranes. As shown further below, the resistance to radon permeation of non-wetted hydrophobic membranes is typically negligible in the present application. And secondly, the use of hydrophobic microporous membranes in the radon reduction process permits (and in fact requires) the use of stripping air at a lower pressure than the water pressure, which is desirable for reasons of both practicality and economics.

It should be noted that the terms "microporous" and "porous" are used interchangeably throughout this disclosure; both terms are meant to be descriptive of all types of porous membranes having pore diameters ranging in size from several tenths of a nanometer on up to microns and exhibiting either isotropic or asymmetric morphology. Hence, membranes commonly referred to as "nanofiltration" or "ultrafiltration" membranes are also encompassed by the terms "porous" and "microporous." In fact, there is no practical lower bound on the pore size of membranes useful in the present invention, so long as their porosity (and hence their permeability) is sufficiently high. The upper bound on membrane pore size is determined by the requirement that the membrane not be penetrated by the nominally non-wetting fluid under conditions of use. Both of these constraints are discussed further in the following paragraphs.

The permeability of hydrophobic, microporous membranes (which is simply the inverse of their mass transfer resistance) can be calculated from the following equation:

$$k_m = (D\epsilon)/(K_{eq}L\tau) \tag{18}$$

where D is the diffusion coefficient of radon in ambient air [estimated at 0.108 cm²/sec], and L, $\tau$, and $\epsilon$ represent the thickness, tortuosity, and porosity of the microporous membrane. Membrane thickness will typically range from about 0.5 to about 5 mils; tortuosities will typically range from about 1 to 10; and porosities will generally be in the range of from about 10% to about 90%. Substitution of reasonable combinations of these membrane parameters into equation (18) yields estimates for the effective permeability of non-wetted hydrophobic microporous membranes of the order of about 10 to about 100 cm/sec, values which are several orders of magnitude larger than aqueous-phase mass transfer coefficients reported in Table I above. This analysis leads to the conclusion that the mass transfer resistance of such membranes will be entirely negligible in comparison to the resistance associated with the aqueous-phase boundary layer discussed in Section 4.1.3.

As regards the upper limit on membrane pore size, it will be essential that the nominally non-wetting fluid not penetrate the pores of the membrane during use by displacing the fluid that preferentially wets the membrane material. In the case of a hydrophobic microporous membrane that ordinarily tends to expel water, for instance, this requires that the water-to-air pressure difference applied across the membrane be smaller than the intrusion pressure at which water could be forced into the hydrophobic membrane. This intrusion pressure can be estimated roughly from the Young-LaPlace equation (ignoring pore shape and other secondary effects for the moment):

$$P = 2\sigma \cos(\Theta)/R_{pore} \qquad (19)$$

where $\sigma$ is the air-water interfacial tension (dynes/cm), $\Theta$ is the air-water contact angle, and $R_{pore}$ is the membrane pore radius (cm). Membrane pore radii of the order of a few tenths of a micron are indicated for the present application, since the water-to-air pressure difference across the membrane will often range from about 5 to 95 psi (e.g., with the water undergoing treatment at distribution pressure and using stripping air at near-atmospheric pressure). For instance, a hydrophobic membrane with 0.1 micron diameter pores has a theoretical intrusion pressure of about 300 psi (about 20 atmospheres) when exposed to "clean" water. However, in practice a substantial safety factor is advisable to account for substantial variations in pore size in a given membrane and to account for the gradual deposition on the membrane pore walls of surface-active contaminants that reduce the hydrophobicity of the membrane (i.e., that lower the interfacial tension $\sigma$). Similar considerations apply to the choice of pore size for hydrophilic membranes, except here it is prevention of intrusion of air into a water-wet membrane that dictates operation below the intrusion pressure upper limit.

In fact, the possibility of gradual membrane fouling, pore blocking, and ultimate wetting must be recognized as a potential drawback to the use of microporous membranes in the present application where "dirty" (i.e., iron-, other foulant- and surfactant-containing) water streams are involved. The membrane must be "rugged" and forgiving from this point of view, inasmuch as extensive water pretreatment is not desirable in this application. It is envisioned that microporous hydrophobic membranes may benefit from periodic cleaning and or treatment with various water-repelling agents (e.g., compounds useful in the "siliconization" or silylation of surfaces) in order to extend their useful non-wetted service life. In this regard, it may be noted that wettability is not an important consideration (or potential problem) where the nonporous membranes of Section 4.2.1 are concerned.

Suitable microporous membranes can be prepared from a large number of organic and inorganic materials, including (without limitation) the various polymers listed in Section 4.2.1 in the context of microporous supports for composite membranes. Because very little radon permeation will occur through the polymer that comprises the solid portion of the microporous membrane matrix, the choice of polymer (or other membrane material) is not particularly crucial from a mass transfer point of view.

Particularly preferred microporous hydrophobic membranes known as "Celgard X10" and "Celgard X20" and commercially available from Hoechst/Celanese (Charlotte, N.C.) are made from polypropylene. These fibers have inner diameters ranging from about 100 microns to 400 microns, wall thicknesses of about 1 mil or 25 microns, and porosities ranging from about 20% to 40%. Their mean pore size of about 0.03 microns is more than sufficient to prevent water intrusion at water-side operating pressures of 15 to 75 psi (about to 5 atmospheres gauge) providing that their hydrophobic properties are maintained during extended operation. Other microporous, hydrophobic hollow-fiber membranes prepared from polypropylene and polypropylene/polybutadiene hollow fibers are commercially available from manufacturers that supply membranes for blood oxygenator devices (e.g., Enka, Mitsubishi), and water-wettable grades of the above fibers as well as films are also available (e.g., from Hoechst/Celanese). In Example 2 of Section 5.0, the performance of a hydrophobic, microporous hollow-fiber Questar module based on a polypropylene membrane is determined experimentally. Other potentially suitable hydrophobic, microporous membranes are prepared from PTFE —for example, Gore Associates' "Goretex" membrane—in the form of tubes, films, and relatively large diameter hollow fibers.

With regard to the choice of hydrophilic membranes, a variety of membrane materials are again available, but for reasons discussed above these will be much poorer performers in radon stripping than their hydrophobic counterparts. For instance, the performance of cellulosic and polyacrylonitrile hydrophilic membranes is explored in Examples 3 and 4, respectively, of Section 5.0 below. Microporous nylon is also a candidate, among others listed in Section 4.2.1 as composite membrane supports.

Procedures for preparing modules containing either nonporous or microporous membranes are straightforward and well known in the membrane art. For example, fabrication of hollow-fiber modules involves potting several thousand fibers in plastic shells fitted with appropriate shell- and lumen-side flow ports. As potting compounds to anchor the fibers, the use of commercial FDA-grade polyurethane, silicone, and epoxy encapsulants approved for medical devices will generally be indicated so as to avoid any potential issues that might otherwise be caused by the leaching of contaminants from the potting compounds and into the treated water.

4.2.3. Immobilized Liquid Membranes

Yet another embodiment of the process and apparatus of the present invention involves the use of immobilized liquid membranes or ILMs as radon-permeable, phase-separating membrane interposed between the water stream being treated and the stripping air stream. Briefly stated, immobilized liquid membranes consist of suitable solvents for the permeant—immiscible with both of the process streams in contact with the two surfaces of the ILM—wherein the membrane liquid is immobilized by capillarity within the pores of a suitably microporous support membrane (Lonsdale, H. K., J. Memb. Sci., 10 (1982) 81-181; Matson, S. L., J. Lopez and J. A. Quinn, Chem. Eng. Sci., 38 (1983) 503-524). The permeation properties of the membrane (i.e., flux and permselectivity) are those afforded by the membrane liquid, while the mechanical properties and geometry of the membrane are provided by the porous support film or fiber. Immobilized liquid membranes are described, for example, by Robb and Reinhard in U.S. Pat. No. 3,335,545.

Figure 7:
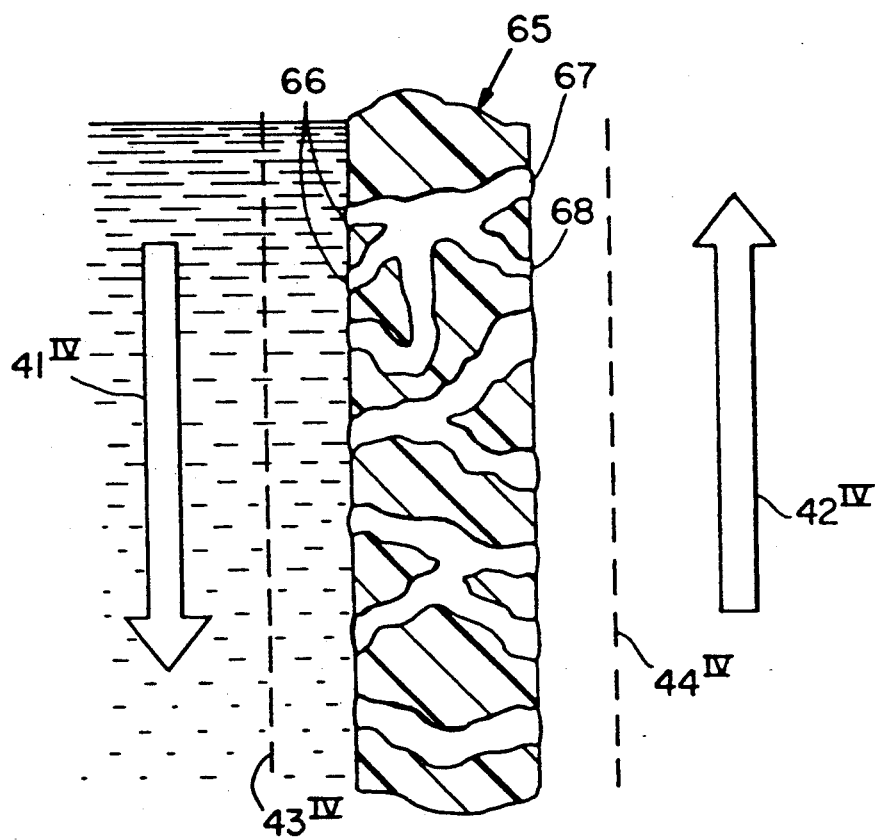
FIG. 7 is a cross-sectional view of an immobilized liquid membrane (ILM) suitable for use in the process of the present invention.

FIG. 7 is a cross-sectional view of an immobilized liquid membrane (ILM) suitable for use in the process of the present invention.

The radon passes from the water stream $41^{IV}$, through the aqueous boundary layer $43^{IV}$, through the solvent-water interface 66, through the water-and-air-immiscible solvent 67 contained in the pores of the matrix polymer which is hydrophobic and wetted by the solvent, through the solvent/air interface 68, through the air-side boundary layer $44^{IV}$, into the air stream $42^{IV}$.

If the membrane liquid is chosen such that the permeant (e.g., radon) has a reasonably high solubility therein (at least compared to its solubility in water), then immobilized liquid membranes have the advantage of being highly permeable as compared to most polymeric films, since transport through them occurs by a solution/diffusion mechanism and both permeant solubility and liquid-phase diffusivity can be high. In operation, waterborne radon gas would first partition from water into the solvent entrapped in the ILM, diffuse across the ILM, and then be released to the stripping air stream as suggested in the schematic diagram of FIG. 7. So long as the pressure difference across the membrane is insufficient to cause displacement of the membrane solvent from the pores by either water or air, the ILM configuration will be mechanically stable. This allowable operating pressure difference (i.e., the intrusion pressure) may be estimated from the Young-LaPlace equation (19) as discussed in Section 4.2.2.

For instance, ILMs suitable for radon stripping will consist of nonvolatile water-immiscible solvents for radon gas fluids entrapped within the pores of a hydrophobic and microporous support membrane (e.g., microporous poly-propylene or polytetrafluoroethylene, among many others). These ILM liquids will be substantially insoluble in and immiscible with water, and further they will exhibit very low volatility or vapor pressure such that they will not be lost to either process stream which they contact in use. While many water-immiscible organic liquids are candidates for use in the present invention as judged by these criteria, it should also be recognized that suitable solvents must also be very safe in view of their intimate contact with drinking water. Useful ILM solvents include but are not limited to silicone oils, halocarbon oils, vegetable oils, and mineral oils. Particularly preferred ILM solvents include the various silicone fluids (e.g., the trimethylsiloxy-terminated polydimethylsiloxane oils) and various fluorocarbon fluids, certain grades of which enjoy approval by the FDA for use in food and medical applications. Particularly preferred solvents include, for example, Dow-Corning's No. 200 Silicone Fluid (350 centistokes) and Petrarch System's PS038 polydimethylsilicone oil (5.0 centistokes). Silicone oils with viscosities of at least 350 centistokes are considered suitable for use in food processing by the Food and Drug Administration in concentrations that do not exceed 10 ppm for "ingestion" and 20 ppm for "incidental contact." As an example, food-grade silicone oils are currently used in the wine industry as fermentation antifoam agents. Also useful will be members of a family of inert and water-insoluble halocarbons such as those being investigated as artificial blood substitutes.

The solubility of radon in these and other ILM solvents is generally reported in terms of a partition coefficient that describes the effectiveness of the solvent in extracting radon from water. This partition (or distribution) coefficient P can be defined as the ratio of organic-phase to aqueous-phase Rn concentrations achieved after the two immiscible phases have come to equilibrium:

$$P = C_{org,eq}/C_{aq,eq} \tag{20}$$

Such partition coefficients are readily determined in simple extraction experiments wherein a measured volume of radon-bearing water is contacted with a measured volume of initially radon-free solvent in a separatory funnel. The partition coefficient can be calculated from the equilibrium radon concentration left behind in the aqueous phase. The distribution of radon between water and a series of 15 different fluorocarbons has been determined experimentally (Lewis, C. et al., Ind. Eng. Chem. Res., 26 (1987) 356-359); their experimental results can be expressed in terms of partition coefficients defined as per equation (20) which ranged from about 10 to 42. Certain fluorocarbons—and in particular inert perfluorochemical oils—are of particular interest inasmuch as they are generally regarded as safe for use in such oxygen-carrying applications as artificial blood substitutes, liquid breathing fluids (Waldrop, M. M., Science, Sep. 8, 1989, pp. 1043-1045) and oxygen carriers for cell culture (King, A. T., B. J. Mulligan and K. C. Lowe, Bio/Technology, 7 (1989) 1037-1042). The solubility of radon in a number of hydrocarbon solvents has also been determined (Pritchard, H. M. and T. F. Gesell, Health Phys., 33 (1977) 577-581; Pritchard, H. M., Health Phys., 45 (1983) 493-499). As an example, toluene was found to be a relatively good solvent for radon, with a partition coefficient P of about 50; however, toluene would not be acceptable as an ILM solvent in the present invention by reason of its toxicity.

Guidance in terms of the choice of suitable ILM solvents may also be gained from comparison of a solvent's Hildebrand solubility parameter "$\delta$" with that of radon gas; the solubility parameter of radon has been variously reported as 6.8, 8.42 and 8.83 (Lewis, C. et al., Ind. Eng. Chem. Res., 26 (1987) 356-359; Barton, A. F. M., Handbook of Solubility Parameters, CRC Press, Boca Raton, Fla., 1983; Prausnitz, J. M., Molecular Thermodynamics of Fluid-Phase Equilibria, Prentice-Hall, Englewood Cliffs, N.J., 1969). Generally speaking, radon will be most soluble in those solvents which are characterized by Hildebrand solubility parameter values that are close to those of Rn itself. For example, the solubility parameter of polydimethylsilicone rubber is reported to be 7.3 by Prausnitz (see the above citation), while that of liquid-phase "dimethyl siloxanes" is reported to be 4.9–5.9 by Brandrup and Immergut (Brandrup, J. and E. H. Immergut, Polymer Handbook, 3rd ed., Wiley & Sons, New York, 1989). The latter reference lists the solubility parameters of aliphatic fluorocarbons as being in the range of 5.5 to 6.2, whereas the solubility parameters of the 15 fluorocarbons tests by Lewis and coworkers fall in a range from 5.50 to 8.11. In view of the similarity between the solubility parameters of radon and those of the various silicone and fluorocarbon fluids, one expects that any of these solvents would be reasonably good choices as ILM solvents from the point of view of radon solubility therein.

Techniques for the preparation of immobilized liquid membranes are well known in the art. One starts with a suitably solvent-resistant and hydrophobic microporous support membrane of the types listed in Sections 4.2.1 and 4.2.3 optionally packaged, for example, in a hollow-fiber membrane module. Next, the ILM solvent is passed through the membrane module (or otherwise contacted with the microporous membrane), permitting it to wet the pores of the support membrane. Finally, excess ILM solvent is removed by wiping the membrane surfaces or by displacing excess solvent from the module's flow channels (e.g., the fiber lumens and shell compartment) but not from the support membrane's pores; the latter operation can be accomplished by blowing excess solvent from the module with air or water. Such ILMs may be recharged (e.g., by flushing with fresh solvent) at appropriate intervals if necessary in order to maintain the integrity of the supported liquid film.

4.3. TYPICAL PROCESS OPERATING CONDITIONS AND SYSTEM DESIGN CONFIGURATIONS

Stripping of waterborne radon is accomplished in the process of the present invention by contacting one surface of a suitably radon-permeable, bulk-fluid-impermeable membrane with radon-containing water while simultaneously contacting the opposite surface of said membrane with stripping gas—preferably, air. The net result is diffusive transport of dissolved radon gas across the phase-separating membrane from the water to the air stream.

It is to be expected that other volatile compounds dissolved in the water stream will also be stripped to a certain extent along with the radon gas. For instance, the preferred membranes chosen for use in the present invention will also be permeable to many volatile organic compounds (VOCs) such as hydrocarbon solvents that also contaminate groundwater supplies. As a result, they will also be stripped from the water stream when the present process is carried out for radon removal, and this may be highly beneficial from the point of view of producing drinking water of acceptable quality.

Water vapor will also be transported across the membrane into the stripping air stream when the vapor pressure of liquid water at its temperature in the stripping module is higher than the partial pressure of water vapor in the stripping air on the opposite side of the membrane. Whether this occurs will depend on the water temperature and stripping air humidity. In the winter when the stripping air can be expected to be relatively dry, co-transport of water vapor can be anticipated; however, in the summer—especially if humid basement air is used to strip relatively cold groundwater, the transport of water vapor could be in the opposite direction. Water vapor transport is essentially of no important consequence to the operation of the present invention in removing dissolved radon.

As discussed in Section 2.0, the water stream undergoing treatment may flow inside or outside of hollow-fiber or tubular membranes, or inside or outside of the "sock" in spiral-wound membrane modules. Substantially the same flow possibilities exist for the stripping air stream. The flow of water may be cocurrent, crosscurrent, or countercurrent to the flow direction of the stripping air on the opposite side of the membrane. In principle, countercurrent flow will be preferred. Radon-enriched stripping air will typically be exhausted to the outside atmosphere and will either be pushed or drawn through the membrane stripping module with a blower or fan mounted either upstream or downstream of the membrane stripping unit.

In order for a transmembrane flux of radon gas to be established, an adequate driving force for radon transport must exist; this driving force is the difference in the chemical potential or activity of radon gas in the two streams in contact with the membrane. In operation, the chemical potential of dissolved radon gas in the water undergoing treatment will be higher than the chemical potential of radon in the stripping air stream. It is this difference in the effective "concentration" of radon on opposite sides of the membrane that gives rise to its diffusive flux—the magnitude of which is proportional to the size of the transmembrane chemical potential difference. A suitably low concentration or chemical potential of radon gas in the stripping air stream is ensured by maintaining an adequate flowrate of stripping gas relative to the water stream being treated in the membrane module.

In principle, faster rates and higher degrees of radon removal are favored by higher stripping air flowrates. The effect of stripping gas flowrate on flux is reflected in the "back-pressure" term of equation (2) of Section 4.1.2; lower air flowrates give rise to higher airborne radon concentrations $C_g$. However, as a practical matter the concentration of radon present in the stripping gas mixture will typically be small compared to that in the water being treated at all but the lower stripping air flowrates. As a general rule, stripping air flowrates of at least 1 ACFH (actual cubic foot per hour) and preferably up to 100 ACFH or greater will be recommended depending on the system capacity and configuration; the invention will operate most efficiently at higher stripping air flowrates.

A minimum stripping air flowrate—supplied by a fan, blower, or compressor (e.g., drawn through the membrane stripping unit with a roof-mounted fan operating in suction)—will be dictated by the requirement that the airborne radon concentration $C_g$ in the exiting stripping air (stemming largely from the required transmembrane flux of radon into the stripping gas stream) be maintained at a level lower than that in equilibrium with the water present on the opposite side of the membrane. Preferably, the flowrate of this radon-diluting stripping air stream will be such that the airborne radon concentration will be but a small fraction (e.g., less than 50%, and ideally much less) of the concentration that would be in local equilibrium with the water being stripped to ensure maintenance of an adequate transmembrane driving force and radon flux.

Equation (2) also indicates the level of airborne radon that is tolerable in the incoming stripping air fed to the membrane stripping device. Typically, this inlet airborne radon level will be insignificant, even when basement air is employed as discussed in Section 4.1.2.

Operating pressures—which will be supplied by conventional pumps and manipulated with flow control valves and back-pressure regulators—have been discussed at length above. To reiterate, nonporous membranes can, in principle, be operated with the higher pressure on either the water or the air side. This flexibility does not exist, however, with microporous membranes, where hydrophobic ones must be operated with the higher pressure on the water stream and hydrophilic ones must be operated with the higher pressure on the stripping air stream. It will further be important with microporous membranes to observe the limits on trans-membrane pressure difference imposed by membrane wettability considerations. Having said this, it will generally be preferable to operate the process of the present invention with the water stream undergoing treatment at substantially the pressure (e.g., 20 to 60 psig) at which it is delivered by the wellhead pump (or other groundwater supply system) and subsequently circulated throughout the household—and to operate with stripping air at a pressure much closer to atmospheric pressure (i.e., at a pressure either slightly above or below atmospheric pressure). An fan or blower in the air stripping stream and an optional circulating pump in the water stream compensate for fluid pressure drops through the membrane module and other system plumbing, as suggested in FIG. 2.

The temperature at which the process of the present invention is conducted is not particularly critical. Higher operating temperatures favor somewhat higher rates and degrees of radon removal, since radon's volatility and its rates of diffusion in water and in polymers both increase with temperature. However, as a practical matter the system will operate without elaborate temperature controls at a temperature dictated by the that of the water supplied to the system.

The membrane stripping system for waterborne radon removal depicted in FIG. 2 has already been discussed in Section 4.1.1 above. Here, we elaborate on alternative process configurations and system designs with a view towards illustrating other embodiments of the present invention. With the benefit of the present disclosure, a number of alternative membrane-based radon-removal system designs and operating protocols may become apparent to those of ordinary skill in the art, alternatives which are within the spirit and scope of the present invention. Accordingly, the discussion that follows is meant only to be exemplary and not all-inclusive of alternative system and process designs.

Figure 8:
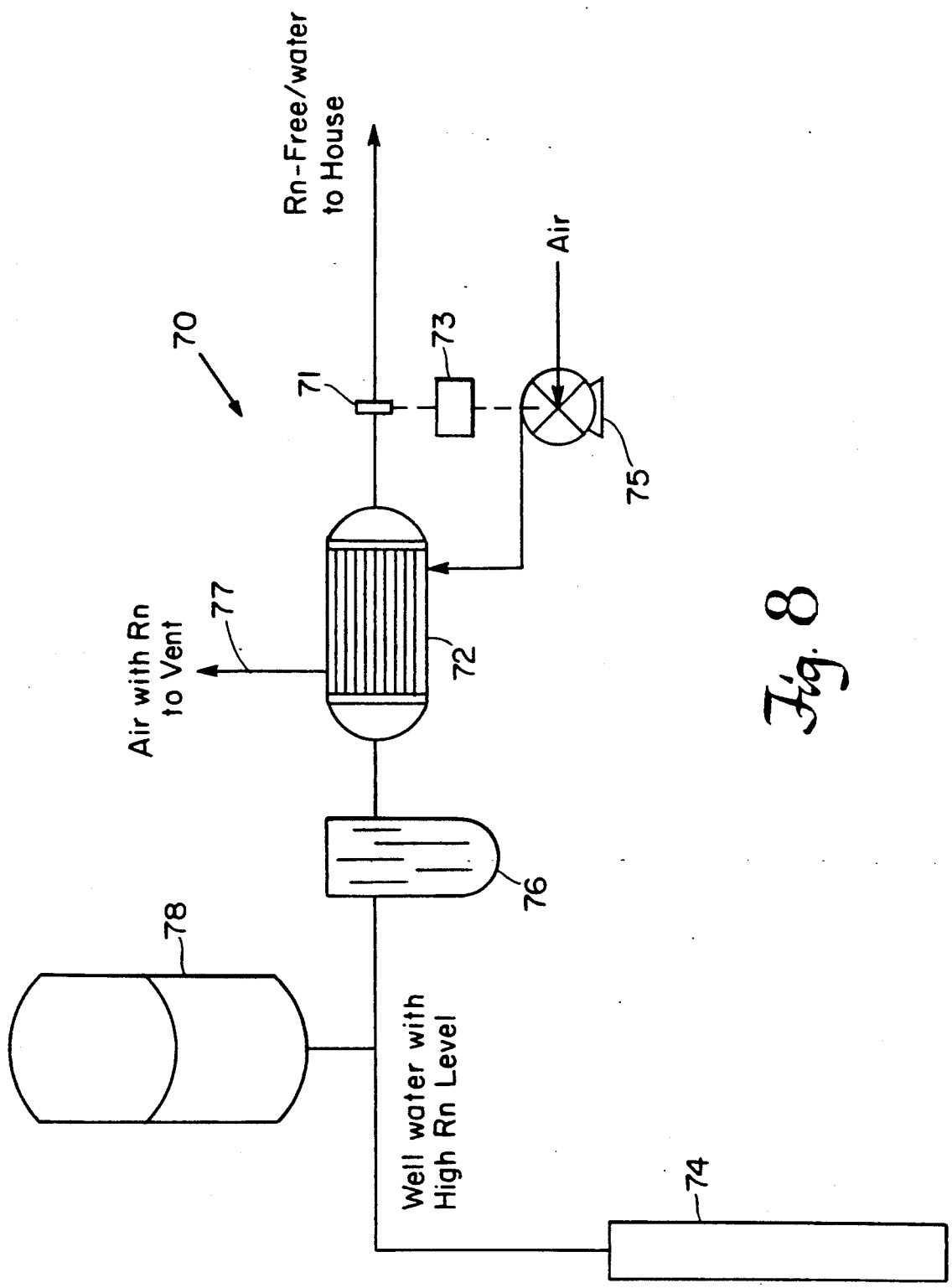
FIG. 8 is a schematic representation of another embodiment of an "on-demand" membrane stripping system for waterborne radon removal.

For example, FIG. 8 illustrates a very basic "on-demand" membrane stripping system 70 wherein water, delivered by well pump 74, flows but once, preferably at pressure, through an optional particle/sediment filter or dissolved iron removal unit 76 and to the membrane stripping unit 72. In this instance, the hydropneumatic "pressure" tank 78 (e.g., a so-called "captive-air" pressure tank) is located upstream of the membrane contactor (stripping) unit. Optionally, a flow-sensitive pressure switch 71, capable of sensing when water is being withdrawn for use within the house, acts through relay 73 (which may be integral with the flow detector/pressure switch 71) to supply power to the stripping air fan or blower 75 during periods of water use. This air fan or blower may either be located "upstream" of the membrane unit 72 as shown to provide stripping air at a slight positive pressure, or it may be located "downstream" of membrane unit 72 between said unit and air vent 77. In the latter case, stripping air is drawn through the membrane unit at a slight negative pressure or "suction."

The system and process configuration of FIG. 8 differs from that shown in FIG. 2 in that the membrane stripping module 72 is located downstream of the captive-air pressure tank 78 that is a standard component of most well water supplies. The advantage in doing this is that the process configuration of FIG. 8 permits radon-containing water to be stripped "on demand" at the flowrate at which it is being used in the home, rather than at the generally higher flowrate at which the submersible well pump 74 refills the pressure tank when its pressure falls to the "cut-in" setpoint. This reduces the membrane area requirement, albeit at the modest cost of adding a flow-sensing switch/relay to control power to the stripping air blower.

The membrane area required in such an "on-demand" system to treat a given flowrate of radon-containing water to a specified level of radon removal on a single-pass, once-through basis can be calculated from equation (9) above if it is assumed that the "back-pressure" term of equation (2) can safely be neglected. (If this is not the case, then the principles of the analysis remain unchanged but the mathematical detail becomes slightly more cumbersome.) Rearrangement of equation (9) yields the following explicit expression for the required membrane area A as a function of water flowrate $V_f$, the overall liquid-phase mass transfer coefficient $K_l$, and the desired fractional radon removal X:

$$A = -(V_f/K_l)ln(1-X) \qquad (21)$$

As discussed further in Section 5.0, we have measured overall radon mass transfer coefficients $K_l$ of approximately 0.0025 cm/sec (0.15 cm/min) for two silicone-rubber-based membrane modules (see Examples 1 and 6). In Table III, membrane area requirements calculated from equation (21) using this mass transfer coefficient are presented for three water flowrates (1, 5, and 10 Lpm) and three degrees of radon removal (80, 90, and 95%). Table III also provides an estimate of the packed-fiber volume of hollow-fiber membrane Rn stripping device based on a quite conservative membrane module surface-area-to-volume ratio of 30 $cm^2/cm^3$ (915 $ft^2/ft^3$) adopted so as to allow for the use of relatively large ID fibers with low water-side axial pressure drops. (It should be noted that the calculated membrane device volumes in Table III correspond only to the volumes of the packed fibers, exclusive of the module shell, fittings, and end caps that can be comparable in size for the smallest devices.)

The packed fiber volume of a membrane stripping device is seen to be much smaller than conventional diffused-bubble aeration vessels of similar capacity (at perhaps 5 to 15 $ft^3$) and even GAC beds (typically 1.5 to 3 $ft^3$).

TABLE III

ESTIMATED MEMBRANE AREA REQUIREMENTS AND PACKED-FIBER VOLUME FOR HOLLOW-FIBER DEVICES

Membrane Area (ft$^2$) and Volume (ft$^3$)

| Water Flowrate | Radon Removal Efficiency | | |
|---|---|---|---|
| | 80% | 90% | 95% |
| 1.0 Lpm | 11.6 ft$^2$ | 16.5 ft$^2$ | 21.5 ft$^2$ |
| (0.26 gpm) | 0.0126 ft$^3$ | 0.0181 ft$^3$ | 0.0235 ft$^3$ |
| 5.0 Lpm | 57.8 ft$^2$ | 82.6 ft$^2$ | 107.5 ft$^2$ |
| (1.32 gpm) | 0.0631 ft$^3$ | 0.0903 ft$^3$ | 0.177 ft$^3$ |
| 10.0 Lpm | 115.5 ft$^2$ | 165.3 ft$^2$ | 215.0 ft$^2$ |
| (2.64 gpm) | 0.126 ft$^3$ | 0.181 ft$^3$ | 0.235 ft$^3$ |

In reality, water is used within a household at various times and at widely varying flowrates. Computer simulations performed for the "on-demand" radon removal system of FIG. 8 show that, when more realistic profiles of water use events are taken into account, actual membrane area requirements are somewhat lower than those suggested in Table III. For instance, much more sophistocated computer simulations show that 9.2 m2 (99 ft2) of membrane area suffices to remove 95% of the radon from the well water typically used by a family of four, assuming a radon mass transfer coefficient Kl of 0.35 cm/min, a partition coefficient Keq of 0.30, and a stripping air flowrate of 2.7 SCFM. At a module packing density of 0.2 L per m2 of membrane surface area, the packed-fiber volume of the membrane stripping module is less than 2 L.

The "ideal" design of a hollow-fiber and other membrane and module configuration will take into account a number of interrelated membrane and module parameters. For example, fiber inside diameter relates both to mass transfer performance (since the module's surface-to-volume ratio or packing density varies inversely with fiber ID) and to axial pressure drops (where larger pressure drops are associated with finer fibers). Moreover, the pressure drop associated with passing water at a given flowrate through a membrane contactor of fixed area also depends on the module's aspect ratio—i.e., the ratio of fluid flow path length to module diameter. A number of alternative membrane and module geometries and dimensions will be suitable for the practice of the invention.

It should further be noted that no allowance has been made in the calculations of Table III for the potential "load-leveling" benefit that is obtainable by incorporating a small and inexpensive circulating pump in a water flow loop comprising a water recirculation conduit, a hydropneumatic or other type of water storage vessel, and the membrane stripping module.

In this regard, we note that Rn-containing water may be treated on a once-through, on-demand basis (i.e., the assumption made in calculating the membrane area requirements of Table III) or, alternatively, this water may be recirculated continuously or at intervals between a storage tank and the membrane device. Water recirculation is but one technique for managing the highly variable demand that will be placed on a membrane stripping system. The recirculation mode of operation will result in a reduced membrane area requirement, but at the expense of introducing the need for additional equipment (e.g., a circulating pump) and system controls.

Another representative membrane stripping system with provisions for water recirculation and storage (shown as optional in FIG. 2) is further shown in the embodiment of the invention illustrated in FIGS. 9 and 10. Membrane stripping systems that incorporate water recirculation and storage can significantly reduce membrane area requirements and module size. An objective in this system design is to permit the membrane stripping system to operate for some defined period of time after the demand for water in the household ceases, thereby minimizing the membrane area requirement. The particular system 80 illustrated in FIGS. 9 and 10 requires the following additional components:

(i) a circulator pump 90 located in a recirculation conduit 95 in fluid communication with both water inlet and outlet ports of the membrane stripping module 82, optionally fitted with a check valve 96 to prevent water backflow;

(ii) a water storage tank 92 with a nominal holding capacity of the order of 10–20 gal or more;

(iii) a three-way solenoid valve 94 to control the disposition of water flowing from the membrane stripping module.

Other system components (e.g., well pump 84, pressure tank 88, sediment or iron removal unit 86, pressure switch 81 and relay 83, stripping air blower 85, and air vent 87) play the same roles as those of their counterparts discussed previously in the context of FIGS. 2 and 8.

FIG. 9 shows the direction of water flow through the system plumbing and the condition of the three-way solenoid valve 94 during periods of water use within the house, while FIG. 10 depicts the situation that prevails for a finite and pre-settable period of time (10 minutes, say) following each significant water use event sensed by pressure/flow switch 81.

During those periods when the house is demanding water, feed water from the pressure tank 88 (and/or well pump 84) flows, preferably countercurrently, to stripping air through the membrane module 82 as shown in FIG. 9. The three-way solenoid valve 94 located downstream of the membrane unit directs this once-stripped water through the water storage tank 92 and thence to the house. No water flows through the recirculation conduit 95 during such periods of water use, since power is not supplied to the recirculation pump through relay 83 until the household demand for water is satisfied. Check valve 96 (or the water recirculation pump 90 itself) prevents bypassing of the membrane stripper 82 during this part of the system operating cycle.

Once water is no longer being withdrawn from the well and/or pressure tank 88, a flow-sensitive switch 81 detects this condition and subsequently changes the position of the three-way solenoid valve 94 and applies power to the recirculation pump 90 as shown in FIG. 10. A timer built into the flow switch 81 or relay 83 maintains the series flow of water through the storage tank 92, recirculation pump 90, and the membrane stripper 82 (in any order) for the preset recirculation period (e.g., 5–10 minutes or longer) or until water is again demanded by the household; stripping air flow is maintained throughout this period, with power to air blower 85 also being controlled by pressure switch 81 and/or relay 83. This operating strategy has the effect of extending the duty cycle of the membrane stripper and thereby significantly reducing the membrane area requirement. Other system and process configurations within the scope of the present invention can accomplish the same effect through the same operating principle. For instance, the direction of water flow through the membrane stripper can be reversed during the recirculation period in another embodiment, thereby eliminating the need for the three-way solenoid valve of FIGS. 9 and 10.

Computer calculations designed to simulate realistic water use patterns for a family of four were again performed to evaluate the efficiency of this particular alternative membrane stripping system design. Based on the same assumptions regarding Kl, Keq, and stripping air flowrate detailed above, it was determined that only 2.75 m2 (29.6 ft2) of membrane would be required to remove 95% of the radon from the incoming well water. At a module packing density of 0.2 L per m2 of active membrane surface, the packed-fiber volume of the membrane stripping module required in the system of FIGS. 9 and 10 would be but 0.55 L.

It is thus clear that the membrane stripping system design incorporating provisions for water recirculation and storage is considerably more efficient than the simpler "on-demand" system of FIG. 8. However, its benefits are gained at the cost of some additional system complexity.

Given the modest requirements of the membrane stripping system for low-pressure stripping air, the system can be operated with continuous flow of stripping air through the module. However, air and water flow control systems are readily incorporated in the apparatus as shown in FIGS. 8, 9 and 10 when and if warranted to more efficiently manage fluid flows through the membrane stripping module. The proper design of appropriate fluid management systems and controls will be apparent to those skilled in the art.

Realistically, it is likely that application of the present process to removal of Rn from groundwater rich in such potential foulants as waterborne iron (in soluble and insoluble forms), suspended solids, and other such materials will be facilitated by pretreating the radon-containing water with a cartridge filter or other such conventional water pretreatment subsystem as known to those of skill in the art. This precaution should extend the useful membrane life and lengthen the operating time interval between cleaning, backflushing, or replacing the membrane device.

Finally, FIG. 11 depicts yet another system and process for waterborne radon removal that is within the scope of the present invention. More particularly, FIG. 11 shows a "hybrid" system wherein radon-containing water is first passed through a membrane stripping subsystem 100 for removal of the majority of the dissolved radon gas—and then is subsequently passed through an activated carbon adsorption subsystem 102 of various types known in the art. The membrane stripping subsystem 100 can take any of the forms contemplated above (see, for example, the membrane stripping systems shown in FIG. 2 and FIGS. 8-10 and discussed above). By the same token, the activated carbon adsorption subsystem 102 may be of conventional designs—e.g., consisting of a packed-bed of granulated activated carbon or GAC, housed in a metal or plastic tank and provided with means for support of the carbon bed and for distribution of water flow through the bed. Procedures for the design and sizing of activated carbon beds—as well as operating procedures—are known in the art. (See, for example, "Fit to Drink?," Cons. Repts., 55:1 (1990) 27-43; Lowry, J. D. and J. E. Brandow, J. Env. Engr., 111:4 (1985) 511-527; "Removal of Radon from Household Water," EPA Publ. OPA-87-011, September 1987; Cothern, C. R., J. Am. Water Works Assoc., 79:4 (1987) 153-158; Lowry, J. D. et al., J. Am. Water Works Assoc., 79:4 (1987) 162-169; Gabler, R., Is Your Water Safe to Drink?, Consumers Union, Mount Vernon, N.Y. (1987); Henschel, D. B., "Radon Reduction Techniques for Detached Houses: Technical Guidance (2nd Edition)," EPA Publ. EPA/625/5-87/019, Research Triangle Park, N.C., January 1988, and references cited therein, and literature available from various vendors of water treatment equipment.) A very significant difference, however, between prior-art carbon adsorption systems and the carbon adsorption subsystem 102 of the present invention is that the size (i.e., the mass of adsorbent required) will typically be much smaller than that which would be required if the membrane stripping subsystem 100 were not present. For example, if the membrane stripping subsystem is operated to remove 90% of the incoming radon, thus leaving at most 10% of the original radon to be removed by the carbon adsorption subsystem, then in principle the size of the latter can be up to an order of magnitude smaller (leaving aside such considerations as bed hydrodynamics and water flow distribution) than would be the case if the total radon load were to be handled by carbon adsorption alone.

The combination of a membrane stripping subsystem 100 and carbon adsorption subsystem 102 is truly synergistic in the sense that each subsystem operates surprisingly effectively in the hybrid process of the present invention—i.e., with much greater efficiency than either system could operate alone. More particularly, membrane stripping is considerably more efficient the higher the concentration driving force for transmembrane radon transport.

Indeed, as shown in design calculations presented above, the size of a membrane stripping system (i.e., its required membrane area) increases dramatically as the required extent of radon removal is increased. However, the effectiveness of GAC adsorption is less sensitive to the radon concentration level; carbon adsorption is thus an efficient "polish filtration" step, capable of removing radon down to extremely low levels. In this manner, the provision of a carbon adsorption subsystem downstream of a membrane stripping subsystem considerably enhances the attractiveness of the latter.

By the same token, however, the use of a membrane stripping operation upstream of a carbon adsorption system alleviates the principal drawback of carbon adsorption as a waterborne radon removal technology—namely, the build-up of other potentially dangerous long-lived and radiation-emitting radionuclides (e.g., Pb-210 and Po-210) on the carbon bed. Accumulation of these radon daughters presents both a health hazard (especially if the carbon bed is improperly shielded or poorly isolated) and a disposal hazard. Moreover, the significance of the problem of radionuclide accumulation on the carbon bed is directly proportional to quantity of radon fed to and removed by the carbon adsorption unit. Thus, by removing the majority of the waterborne radon in the membrane stripping subsystem 100 (and ultimately venting the stripped radon gas to the atmosphere), the load on the carbon adsorption unit used as a "polishing" filter is dramatically reduced, and the major disadvantage of carbon adsorption—namely, accumulation of harmful radionuclides—is thus substantially alleviated.

In addition to the application of the method and apparatus of the present invention by individual homeowners with private wells, customers of small private and public water systems based on groundwater supplies with high radon levels may also benefit from membrane stripping—either by its use in individual homes or at the site of the private, community, or public water company's facility. Although this application has not been emphasized in the above discussion, it will be clear to those skilled in the art that precisely the same design principles and many of the benefits of membrane-based radon stripping systems will also apply to the invention as operated at this larger scale.

5.0. EXAMPLES

Experimental Apparatus and Procedures. Here we describe the test apparatus used for measuring the effective radon permeability and waterborne radon removal efficiency of membrane modules containing membranes of several different classes. Only minor changes in the test apparatus (e.g., valving) and/or test conditions (e.g., operating pressures) were required to accomodate the several types and sizes of membrane devices employed. Specifically, membrane modules ranging in size from 75 to 15,000 $cm^2$ of effective membrane area were evaluated. Moreover, membranes with a number of membrane chemistries, morphologies, and structures were evaluated as listed below:

hydrophobic and hydrophilic chemistries;
porous and nonporous morphologies; and
isotropic, asymmetric, and composite structures.

Table IV summarizes the membranes and membrane modules employed in reduction to practice of selected embodiments of the present invention.

With the exception of the spiral-wound flat-sheet membrane packaged in the Sci-Med Model 0400-2A module of Example 1 below, all membranes tested were in the form of hollow fibers that ranged in size from about 200 to about 240 microns inner diameter; hollow fiber wall thicknesses (measured in the water-wet state in the case of swellable hydrophilic membranes) ranged from about 25 to 50 microns. Air and water were directed through these hollow fiber modules in counter-current flow, with the water flowing through the lumen or bores of the hollow fiber and the stripping air directed through the shell-side space in the module. This particular flow configuration was chosen so as to maximize radon mass transfer efficiency as discussed above.

The Sci-Med module of Example 1 was unique in that it contained a flat-sheet membrane (as opposed to hollow fibers) packaged in a spiral-wound configuration; more particularly, it employed a 75-micron-thick film of PDMS silicone rubber. Water was made to flow axially through the Sci-Med unit—i.e., between adjacent turns of the envelope or "sock" formed by the PDMS membrane and parallel to the axis of the spiral envelope. The stripping air stream was made to execute a spiral flow path within the channel defined by the spacer material within the PDMS membrane envelope. Air and water flows countercurrent to one another in this module. The manufacturer states that this module and the membrane contained therein are the subject of U.S. Pat. Nos. 3,489,647, 3,792,978, 3,819,772, and 3,892,533.

Additional details relating to membrane and module characteristics are provided below in describing individual test conditions and experimental results.

The test apparatus consisted of the several pumps, pressure gauges, valves, tubing, and fittings as were required to supply radon-laden well water and stripping air to membrane modules at various flowrates and pressures; the apparatus permitted independent control of the flowrates and module-exit pressures of both fluid streams. The Rn-containing water supply consisted of wellwater from a residence that was tested by a commercial radon-testing laboratory (Key Technology, Inc., Jonestown, Pa.) and found to contain 15,290 picoCuries per liter (pCi/L) of dissolved radon gas. (This result agrees well with a value of 14,000 pCi/L obtained for the same well about six months earlier.) This feed water, pressurized by the well pump, entered the house at a pressure of about 25–40 psig and was stored briefly (a matter of several minutes) in an accumulator (a hydropneumatic tank) of approximately 40 gallons total capacity. Feed water was subsequently passed through a 5 micron dirt/rust filter (Cuno, Meriden, Conn.) and from there was directed to the membrane stripping module under test. The feedwater flowrate was controlled by adjustment of a metering valve just upstream of the module, and water exit pressure could be controlled by throttling a second needle valve on the exit line. Inlet and exit water pressures (and thus the water-side pressure drop within the module) could be measured on a single pressure gauge by means of a three-way switching valve arrangement. Since the focus of these experiments was determination of the permeabilities of individual membrane types to dissolved radon gas—and hence their suitability in a membrane stripping process for waterborne Rn reduc-

TABLE IV

| Module Source | Membrane Material | Membrane Type | Membrane Area ($cm^2$) | Flow Pattern |
|---|---|---|---|---|
| Sci-Med 0400-2A | PDMS (hydrophobic) | Nonporous | 4,000 | Cross-Current |
| Questar/Celanese | PP (hydrophobic) | Microporous | 13,000 | Counter-Current |
| Asahi AM-300M | RC (hydrophilic) | Porous (gel-type) | 15,000 | Counter-Current |
| Sepracor Model LP | PAN-based Copolymer (hydrophilic) | Asymmetric, Microporous | 7,500 | Counter-Current |
| Expt'al. Composite | PDMS/PC on PAN Fiber (hydrophobic coating) | Composite (dense coating on porous support) | 75 | Counter-Current |

PDMS: Polydimethylsilicone (polydimethylsiloxane) Rubber
PP: Polypropylene
RC: Regenerated Cellulose
PAN: Polyacrylonitrile
PDMS/PC: Polydimethylsiloxane/polycarbonate Block Copolymer (MEM-213, General Electric Company, Schenectady, NY)

tion—it was unnecessary to operate the test modules at the full pressure of the household water system.

Untreated basement air was used as stripping gas. This air had been previously tested for its radon content over a period of about a year and had been found to contain from about 4 to about 12 pCi/L of Rn gas. However, airborne Rn concentrations of this magnitude have a negligible effect on the performance of a Rn stripping device for reasons related to radon's very favorable water-to-air equilibrium distribution ratio (see above). Stripping air was supplied by an aquarium pump with a maximum output of about 1.7 Lpm when discharging to atmospheric pressure. The flowrate of the stripped water stream exiting the membrane module was measured by collection in graduated cylinders over a timed interval, and the corresponding flowrate of radon-laden air exiting the module was measured by water displacement.

In testing modules that contained membranes that were not wetted by water (i.e., with either hydrophobic microporous membrane or with nonporous or "dense" membrane), the water stream was maintained at a pressure higher than that of the stripping air stream everywhere in the membrane device—i.e., a positive water-to-air transmembrane pressure difference (typically, a few psi) was maintained. This was accomplished in most experiments by adjusting a throttling valve on the water discharge line from the membrane module, although a static water leg was used to maintain this water discharge head in one instance.

In testing modules that contained membranes that were wet by water (e.g., those housing such hydrophilic membranes as the asymmetric microporous PAN hollow fibers and the gel-type regenerated cellulose fibers), it was necessary to maintain a higher pressure on the stripping air stream than on the water stream in order to prevent pressure-driven ultrafiltrative flow of water across the membrane—i.e., a positive air-to-water transmembrane pressure difference had to be maintained when using these hydrophilic and porous membranes. This was accomplished by adjusting a throttling valve on the air discharge line, while discharging the radon-depleted water stream to atmospheric pressure. A pressure gauge was provided for measurement of inlet air pressure, though the latter value typically did not differ significantly from atmospheric pressure; only with the SciMed Model 0400-2A module was there a significant air-side pressure drop within the membrane module.

Once the desired water and air stream flowrates and operating pressures had been established, the system was allowed to come to steady state, and 1 L samples were collected of both the incoming Rn-containing feed water and the exiting Rn-depleted water that had been air stripped in the membrane device. Typically, the feed water flowrate was varied over a range of about three- to five-fold in order to evaluate the efficiency of a particular membrane module in stripping radon from water passed through the device at various throughputs.

Waterborne Radon Analysis. Concentrations of dissolved radon gas were generally measured using a gamma-counting procedure, calibrated by analysis of duplicate samples submitted to commercial laboratories equipped for measuring waterborne Rn concentrations. Samples of feed water and of air-stripped, Rn-depleted water were collected in 1-liter glass or plastic bottles, taking appropriate precautions to avoid devolatilization and loss of radon gas in the sampling process. Next, approximately 1 gram amounts of granulated activated carbon (GAC), in the form of 1-2 mm diameter particles, were added to the sample bottles with agitation. After a GAC/water contact time of about 6 to 8 hours, during which period the bottles were periodically shaken and much of the dissolved radon gas was adsorbed on the activated carbon and thus concentrated on the solid, the GAC was recovered by filtration and transferred to plastic sample vials for loading into a United Technologies/Packard Multi-Prias Gamma Counting System.

Radon itself is an emitter of alpha radiation and is therefore not directly quantifiable by gamma counting procedures. However, several of the "daughter" products formed upon the radioactive decay of Rn are, in fact, emitters of gamma radiation upon their subsequent decay. This formed the basis for an indirect but accurate and convenient means for measuring dissolved radon concentrations. In particular, this secondary gamma radiation was proportional to the initial concentration of dissolved radon gas in the water sample under analysis, as proven by measurement of waterborne Rn concentrations in feedwater diluted at various ratios with boiled and therefore Rn-free water. With appropriate calibration, this gamma radiation associated with Rn daughters could be used to quantify dissolved radon gas at the levels pertinent to the experiments described below.

GAC samples obtained as described above were counted in the iodine-125 energy window of the Multi-Prias instrument for 15 minute periods, and raw counts were corrected for background radiation by subtraction of "blanks". Typically, gamma counts were accurate to about 5%, and absolute calibration of the analytical procedure was accomplished by gamma analysis of samples that were simultaneously sent to a commercial laboratory for quantification by a standard scintillation counting technique. Multiple feed water analyses were also performed as a part of every membrane module test run. Thus, fractional removal of radon in the membrane devices could have been assessed accurately even if it had not been possible to obtain an absolute calibration of the sensitivity of the gamma-based analytical procedure.

The calibration factor relating gamma counts from the GAC sample to waterborne radon concentration is a function of a number of variables, including the time of exposure of the activated carbon to the water sample, the ratio of GAC to water sample weights, etc. For this reason, individual calibration factors varied slightly from test to test, and accordingly these factors were determined for each membrane stripping module test. A typical calibration factor was 27 pCi/L of dissolved Rn gas per cpm of background-corrected gamma radiation measured at "standard" assay conditions (i.e., 1 L water sample, 1 g of GAC sorbent, 7.5 hours GAC/water contact period, and 15 min count in the $I^{125}$ window of the Multi-Prias gamma counter).

Data Reduction and Analysis. The principal purpose in conducting the experiments described below was to assess the overall radon permeability of stripping modules containing various types of membrane and to determine their relative mass transfer performance. From this information, preferred types of membrane for use in the practice of the invention could be and were identified.

As discussed above, radon transport from water to air in a membrane stripping system is a multistep process wherein three individual transport resistances can, in principle, be identified. In particular, the overall transport resistance 1/K1 can be viewed as the sum of individual aqueous-phase, membrane, and gas-phase transport resistances:

$$1/K_1 = (1/k_l) + (1/k_m) + (K_{eq}/k_g) \quad (22)$$

where $k_l$ and $k_g$ are the individual liquid- and gas-phase mass transfer coefficients in cm/sec and km is an effective membrane permeability (expressions for which have been provided above). It will be recalled that the gas-phase resistance is, for all practical purposes, negligible in the process of the present invention. The objective of our experiments was to determine values of the overall mass transfer coefficient $K_1$ indicative of the radon removal capability of various membrane types.

As discussed above, integration of the differential mass balance equation—coupled with the expression for transmembrane radon flux—leads to the following relationship between inlet and exit water-phase Rn concentrations $$\ln(C_{l,in}/C_{l,out}) = K_1 A/V_f \quad (23)$$

as a function of overall module mass transfer coefficient, membrane area, and feed water flowrate. This equation may be rearranged as follows in terms of the fractional removal "X" of Rn removed in the device:

$$\ln(1-X) = -K_1(A/V_f) \quad (24)$$

Thus, theory predicts that a plot of "1−X" (i.e., the fraction of Rn remaining) as a function of the membrane-area-to-feed-flowrate ratio "$A/V_f$" should be linear on semi-logarithmic coordinates. Moreover, the negative of the slope of this line should yield the desired overall Rn mass transfer coefficient $K_1$. It will be appreciated that the steeper (i.e., the more negative) the slope, the higher will be the module's overall mass transfer coefficient, and hence the more effective it will be in waterborne radon removal.

By measuring the extent of radon removal at several water flowrates, this theoretical analysis could be (and was) validated. Moreover, this procedure enabled us to achieve good average values of the overall coefficient over a wide range of water flowrates with membrane devices that varied greatly in size.

FIG. 12 is a series of semi-logarithmic plots (A-E) relating the experimentally determined fractional degree of radon removed in a variety of membrane stripping modules to the membrane areas in those modules and to the flowrate of water being treated.

EXAMPLE 1: Radon Removal With a Non-Porous Silicone Rubber Membrane.

A Sci-Med Model No. 0400-2A membrane oxygenator (Sci-Med Life Systems, Inc., Minneapolis, Minn.) was employed in this example. It contained 0.4 m² of a non-porous (i.e., "dense") film prepared from pure dimethylsilicone rubber (polydimethylsiloxane); the effective thickness of this film as given by the manufacturer is 3 mils (approximately 76 microns). As explained above, this module was unique among those tested inasmuch as it contained flat-sheet membrane (as opposed to hollow fibers) packaged in a spiral-wound configuration. Water was made to flow axially through the unit between adjacent turns of the PDMS membrane envelope, while stripping air executed a spiral flow path within the spacer material inside the PDMS membrane envelope. Thus, air and water flows were essentially countercurrent.

The test began by directing feed water containing about 15,290 pCi/L of dissolved radon gas through the membrane module at an "initial" flowrate of 255 mL/min (the average of two values measured by collection). The water exit pressure was controlled at 0.6 psig by adjusting the throttle valve; the water pressure measured at the inlet to the module was 1.1 psig (corresponding to a water-side pressure drop within the module of about 0.5 psig). Next, stripping air was passed into the module on the opposite side of the PDMS membrane contained therein, and its flowrate was adjusted to about 1.01 Lpm (measured at normal temperature and pressure by water displacement). The exiting air stream was at atmospheric pressure, while the stripping air inlet pressure was found to be slightly less than 0.5 psig. Thus, the membrane operated with a somewhat higher pressure on the water stream being treated—i.e., at a small but positive water-to-air-side transmembrane pressure difference.

After 7-8 L of water had been passed through the membrane module, a 1 L sample of the air-stripped water was collected, along with a 1 L sample of feed water for use in calibrating the gamma emission-based Rn assay. The "final" water flowrate was remeasured after sample collection and determined to be 227 mL/min. An average of the "initial" and "final" water flowrates (i.e., 241 mL/min) was used in the calculation of the modules overall Rn mass transfer coefficient (see below). Additional feed and exit water samples were taken in a similar manner at lower water flowrates of 160 and 75 mL/min to determine the effect of flowrate on radon removal efficiency; exit water pressure and stripping air flowrate were unchanged during these measurements.

Water samples were next contacted with an activated carbon adsorbent for several hours, and gamma radiation emitted by the GAC was subsequently measured. Concentrations of radon in the membrane-treated water were determined as discussed above, and the fractional radon removal "X" was calculated from the ratio of outlet to inlet concentrations. Results are summarized in Table V.

These data were plotted on semilogarithmic coordinates (see FIG. 12, Plot A) and analyzed by the procedure described above. It may be seen that the data do indeed fall on a straight line when handled in this manner, confirming the validity of the mass transfer analysis and the method of data reduction. The negative of the slope of the line shown for this unit in FIG. 12 yields a value of 0.134 cm/min (2.24×10⁻³ cm/sec) for

TABLE V

RADON REMOVAL WITH A NON-POROUS SILICONE RUBBER MEMBRANE (Sci-Med Model 0400-2A)
Membrane Area A = 4000 cm²

| Water Flowrate (cm³/min) | A/V_f (min/cm) | Fraction Rn Removed (X) | Fraction Rn Remaining (1 − X) |
|---|---|---|---|
| 75 | 53.3 | 0.994 | 0.006 |
| 160 | 25.0 | 0.965 | 0.035 |
| 241 | 16.6 | 0.907 | 0.093 | the overall radon mass transfer coefficient of this module containing a dense film of PDMS membrane with an effective thickness of 76 microns (see Table X). From this experimental result and design equations presented above, the radon removal performance of this module can be calculated for any particular water flowrate.

EXAMPLE 2: Radon Removal with a Microporous, Hydrophobic Polypropylene Hollow-Fiber Membrane Module A microporous, hydrophobic polypropylene membrane in the form of hollow-fibers packaged in a module with an effective area of 1.3 m² was obtained from the Questar division of the Hoechst-Celanese Corp. (Charlotte, N.C.). The X20 HF membrane contained in this unit had a nominal hollow fiber wall thickness of 1 mil (25 microns) and an inner diameter of 240 microns. The nominal membrane pore size was reported to be 0.03 microns, with a porosity of about 40%. Because of the small membrane pore size and the hydrophobic nature of the polypropylene material from which the membrane was made, the initially dry pores resisted wetting by water during the experiments described below.

Feed water (at various flowrates) and stripping air (at a flowrate of about 1.65 Lpm at NTP) were supplied to the module in a countercurrent flow configuration, with water directed down the lumen of the hollow fibers and stripping air directed through the shell-side compartment of the membrane module. The exit pressure of the water stream was controlled at a value of about 1 psig, whereas air exited the module at atmospheric pressure. A positive water-to-air transmembrane pressure difference was maintained throughout the test, in order to localize the water/air interface at the lumenal surface of the membrane and so prevent a pressure-driven flux of air across the membrane and into the water stream. For the most part, experimental procedures paralleled those described in Example 1 above. Radon removal efficiency was determined for this microporous, hydrophobic hollow-fiber membrane module at feed water flowrates of 136, 228, and 436 mL/min; results are summarized in Table VI.

TABLE VI

RADON REMOVAL WITH A MICROPOROUS, HYDROPHOBIC POLYPROPYLENE HOLLOW-FIBER MEMBRANE MODULE
Questar Polypropylene X20 Membrane
Membrane Area A = 13,000 cm²

| Water Flowrate (cm³/min) | $A/V_f$ (min/cm) | Fraction Rn Removed (X) | Fraction Rn Remaining (1 − X) |
|---|---|---|---|
| 136 | 95.6 | 0.960 | 0.040 |
| 228 | 57.0 | 0.869 | 0.131 |
| 486 | 26.7 | 0.655 | 0.345 |

These data were plotted on semilogarithmic coordinates (see FIG. 12, Plot B) and analyzed by the procedure described above. The negative of the slope of the line shown for this unit in FIG. 12 yields a value of 0.0342 cm/min (5.70×10⁻⁴ cm/sec) for the overall radon mass transfer coefficient of this module containing a 25-micron-thick microporous, hydrophobic polypropylene hollow fiber membrane (see Table X). This value is about 25% that of the corresponding value for the spiral-wound module containing dense PDMS membrane described in Example 1.

EXAMPLE 3: Radon Removal with a Gel-Type, Hydrophilic Cellulosic Hollow-Fiber Membrane Module In this experiment, a commercially available hemodialysis hollow-fiber membrane module was evaluated for its radon removal performance. The module used was designated AM-300M by its manufacturer, Asahi Medical Co. (Tokyo, Japan); it is distributed in the U.S. by Mediflex International, Inc. (West Caldwell, N.J.). It contained approximately 1.5 m² of gel-type regenerated cellulose membrane in the form of hollow fibers; such hemodialysis fiber typically has an inner diameter of about 220 microns and a wall thickness of about 25 microns (both measured wet).

It should be noted that pore size and porosity are not meaningful in characterizing this type of membrane. Cellulosic dialysis films and fibers are probably best envisioned as a highly swollen polymeric membrane gel capable of passing microsolutes (e.g., urea) but rejecting macrosolutes (e.g., proteins) in their typical application to hemodialysis. Because the cellulosic polymer is very hydrophilic and water-swollen, such membranes are highly permeable to water when a transmembrane pressure difference is applied, despite the fact that such membranes do not possess discrete membrane pores. The membrane contained in the AM-300M module was reported to have a water ultrafiltration rate of 4.3 mL/hr-m²-mmHg.

Feed water (at various flowrates) and stripping air (at a flowrate of from 230 to 400 mL/min at NTP) were supplied to this module in a countercurrent flow configuration, with water directed down the lumen of the hollow fibers and stripping air directed through the shell-side compartment of the membrane module. Because the cellulosic membrane was hydrophilic and therefore wet by water, it was necessary to maintain a positive air-to-water transmembrane pressure difference at all points within the membrane module—i.e., to operate with stripping air at a pressure somewhat higher than that of the water stream being treated. This was accomplished by throttling the back-pressure-control needle valve on the exiting air stream to maintain an air exit pressure of about 1.1 to 1.5 psig. Water was discharged to atmospheric pressure. Since the water stream pressure drop within the module never exceeded about 1.0 psig, a positive air-to-water pressure difference was ensured (i.e., exit air pressure always higher than inlet water pressure). Operation in this manner prevented any pressure-driven flux of water across the membrane during the radon stripping operation and fixed the water/air interface at the shell-side surface of the water-swollen hollow-fiber membrane.

Experimental procedures paralleled those described in Example 1 above. Radon removal efficiency was determined for this gel-type, hydrophilic hollow-fiber membrane module at feed water flowrates of 37, 79, and 230 mL/min with the results shown in Table VII.

TABLE VII

RADON REMOVAL WITH A MICROPOROUS, HYDROPHILIC CELLULOSIC HOLLOW-FIBER MEMBRANE MODULE
Asahi Medical AM-300M Hemodialysis Module
Membrane Area A = 15,000 cm²

| Water Flowrate (cm³/min) | $A/V_f$ (min/cm) | Fraction Rn Removed (X) | Fraction Rn Remaining (1 − X) |
|---|---|---|---|
| 37 | 401 | 0.977 | 0.023 |
| 79 | 189 | 0.888 | 0.112 |
| 230 | 65 | 0.673 | 0.327 |

These data were plotted on semilogarithmic coordinates (see FIG. 12, Plot C) and analyzed by the procedure described above. The negative of the slope of the line shown for this unit in FIG. 12 yields a value of 0.0171 cm/min (2.86×10⁻⁴ cm/sec) for the overall radon mass transfer coefficient of this module containing a 25-micron-thick regenerated cellulose hollow fiber membrane (see Table X). This value is about 13% that of the corresponding value for the spiral-wound module containing dense PDMS membrane described in Example 1.

EXAMPLE 4: Radon Removal with a Microporous, Hydrophilic Polyacrylonitrile Hollow-Fiber Membrane Module In this experiment, a commercially available membrane solvent extraction hollow-fiber membrane module was evaluated for its radon removal performance. The device used was designated Model LP by its manufacturer, Sepracor, Inc. (Marlborough, Mass.) and is sold for use in Sepracor's MSX-500 laboratory system for membrane solvent extraction (MSX) process development. This membrane module contained approximately 0.75 m$^2$ (based on inner area) of a microporous hollow fiber fashioned from a hydrophilic copolymer consisting primarily of polyacrylonitrile (PAN). The membrane structure is known to be asymmetric (as opposed to isotropic), consisting of a protein-retentive "skin" layer on its lumenal surface which is supported by a 50-micron-thick porous wall region characterized by submicron pores. The inner diameter of the hollow fibers is 205 microns. Membranes with similar chemistries and morphologies are used in hemofiltration applications and are commercially available from Asahi Medical Co. (e.g., their Model PAN-150 hemofilter).

Because the polyacrylonitrile copolymer membrane of the Model LP module is hydrophilic and porous, the membrane is highly permeable to water if a transmembrane pressure is applied. The microporous membrane contained in the Model LP module was found to have a water ultrafiltration rate of 46 mL/hr-m$^2$-mmHg, about ten times higher than that of the gel-type hydrophilic cellulosic membrane used in Example 3 above.

Feed water (at various flowrates) and stripping air (at a flowrate of from 320 to 330 mL/min at NTP) were supplied to this module in a countercurrent flow configuration, with water directed down the lumen of the 1.1 to 1.5 hollow fibers and stripping air directed through the shell-side compartment of the membrane module. Because the PAN-copolymer membrane was hydrophilic and therefore wet by water in use, it was necessary to maintain a positive air-to-water transmembrane pressure difference at all points within the membrane module—i.e., to operate with stripping air at a pressure somewhat higher than that of the water stream being treated. This was accomplished by throttling the back-pressure-control needle valve on the exiting air stream to maintain an air exit pressure of about 1.9 to 2.0 psig. Water was discharged to atmospheric pressure. Since the water stream pressure drop within the module varied from 0.5 to 1.7 psig, a positive air-to-water pressure difference was ensured (i.e., exit air pressure always higher than inlet water pressure). Operation in this manner prevented any pressure-driven flux of water across the membrane during the radon stripping operation and fixed the water/air interface at the shell-side surface of the water-swollen hollow-fiber membrane.

Experimental procedures paralleled those described in Example 1 above. Radon removal efficiency was determined for this microporous, hydrophilic hollow-fiber membrane module at feed water flowrates of 105, 217, and 385 mL/min with the results shown in Table VIII.

TABLE VIII

RADON REMOVAL WITH A MICROPOROUS, HYDROPHILIC PAN-COPOLYMER HOLLOW-FIBER MEMBRANE MODULE
Sepracor Model LP MSX Module
Membrane Area A = 7,500 cm$^2$

| Water Flowrate (cm$^3$/min) | A/V$_f$ (min/cm) | Fraction Rn Removed (X) | Fraction Rn Remaining(1 − X) |
| --- | --- | --- | --- |
| 105 | 71.4 | 0.590 | 0.410 |
| 217 | 34.6 | 0.374 | 0.626 |
| 385 | 19.5 | 0.229 | 0.771 |

These data were plotted on semilogarithmic coordinates (see FIG. 12, Plot D) and analyzed by the procedure described above. The negative of the slope of the line shown for this unit in FIG. 12 yields a value of 0.0126 cm/min (2.10×10$^{-4}$ cm/sec) for the overall radon mass transfer coefficient of this module containing a 50-micron-thick polyacrylonitrile hollow fiber membrane (see Table X). This value is about 9% that of the corresponding value for the spiral-wound module containing dense PDMS membrane described in Example 1.

EXAMPLE 5: Fabrication of a Composite Hollow-Fiber Membrane Module Based on a Silicone Copolymer In this example, an experimental composite membrane module was prepared in which a silicone/polycarbonate copolymer film was deposited by solution coating procedures onto a microporous PAN support fiber. The PAN support membrane was identical to that described in Example 4 above. However, a module with a much smaller effective membrane area (75 cm$^2$ based on inner diameter) was employed in the present example. This experimental module consisted of about 225 hollow fibers (205 microns ID, 50 microns wall thickness) with an effective length of about 5.2 cm. The materials of construction of the module (namely, nylon and epoxy) were chosen to be resistant to the effects of the methylene chloride solvent subsequently used in the coating procedure described below.

The PAN support membrane was coated by contacting it with a 4.0 wt % solution of a solvent-castable silicone copolymer in methylene chloride. The particular polymer used was obtained as a sample from the Membrane Products Operation of the Genera Electric Company (Schenectady, N.Y.); that company's designation for this material is "MEM-213." It is known to consist of a block copolymer of polydimethylsiloxane (PDMS or "silicone rubber") and bisphenol-A polycarbonate (i.e., the material in General Electric's Lexan ® polymer); the dimethyl siloxane content of this material is about 55% by weight. This block copolymer is solvent castable and a good film-former.

The coating operation consisted of loading (by means of a 50 mL syringe) either the shell or lumen compartments of the PAN membrane module with the silicone/polycarbonate solution, and simultaneously applying a modest vacuum (generated by a water aspirator) to the opposite compartment. The small transmembrane pressure difference so applied caused some penetration of the silicone copolymer solution into the membrane pores, at the same time as the highly volatile methylene chloride solvent was being evaporated from the solution. After a minute or two of such exposure, excess polymer solution was blown out of the membrane module with air. The remaining solvent was evaporated by simultaneously blowing compressed air through that compartment originally containing the polymer solution and by continuing to apply a vacuum to the opposite surface of the membrane. This procedure was repeated as necessary until a silicone copolymer film had been deposited which could be shown to be impermeable to bulk water (see below). The particular module prepared here (and subsequently tested for its radon removal ability in Example 6) was first exposed to the coating polymer solution on the shell side, and then subsequently exposed an additional two times to coating polymer solution on the lumen side of the PAN support fiber.

In order to verify that the lumen compartment of the module had not become obstructed with dried polymer solution during the coating procedure, the "axial conductance" of the module—defined as the flowrate of water that could be passed through the fiber lumens of the module per unit of applied pressure drop—was measured for both coated and uncoated modules and compared. The final value of the "after coating" axial conductance measured for the test module of Examples 5 and 6 was 1.58 mL/min-inch $H_2O$, which compares favorably with the value of 1.66 mL/min-inch $H_2O$ measured for an uncoated module. Hence, the lumen compartment of the coated module was not obstructed by the solution coating procedure.

In order to verify that an integral film of silicone copolymer had been deposited upon the PAN support fiber, the hydraulic permeability of the fiber in the module was measured after each coating step and compared with the value for an uncoated, "control" module. Measurements were made by (i) filling the module with water and closing one of the lumen-side ports, (ii) attaching a length of plastic tubing to one of the lumen-side ports of the module and filling it with water, (iii) elevating the open length of water-filled tubing to apply a hydrostatic pressure to the lumenal compartment, and (iv) measuring the rate of water ultrafiltration into the shell compartment by monitoring the rate at which the water fell in the attached tubing.

Whereas the hydraulic permeability of uncoated modules was generally about 40 mL/min-m$^2$-psi, the first coating operation resulted in an approximately 20-fold decrease in the hydraulic permeability of the module (to 1.7 ml/min-m$^2$-psi). The hydraulic permeability of the module after the final coating operation was immeasurable by this technique, and thus the module was judged suitable for evaluation of its radon removal performance.

EXAMPLE 6: Radon Removal with a Composite Hollow-Fiber Membrane Module Based on a Silicone Copolymer In this example, the composite hollow-fiber membrane module prepared in Example 6 by coating a silicone/polycarbonate copolymer atop a PAN support membrane was tested for its ability to remove water-borne radon.

Feed water (at an average flowrate of 32 mL/min) and stripping air (at a flowrate of about 1.65 Lpm at NTP) were supplied to the module in a countercurrent flow configuration, with water directed down the lumen of the hollow fibers and stripping air directed through the shell-side compartment of the membrane module. The module exit pressure of the water stream was controlled hydrostatically at a value of about 0.5 psig (by discharging it at a level of 29 inches above the centerline of the membrane module); the resulting inlet water pressure was about 1.5 psig at the conditions of the test, consistent with a 1.0 psi water-side pressure drop across the module. Stripping air exited the module at atmospheric pressure. Thus, a positive water-to-air transmembrane pressure difference was maintained throughout the test. However, no pressure-driven convective transmembrane flux of water occured during the test despite the microporous and hydrophilic nature of the PAN support fiber for the reason that the nonporous silicone/polycarbonate coating proved impermeable to bulk water transport.

For the most part, experimental procedures paralleled those described in Example 1 above. One exception is that a foil-lined plastic sampling bag was used to collect the exiting water sample. This allayed concerns that residual radon might otherwise be lost from the sample at the low water flowrate of the test (made necessary by the small device size). Radon removal efficiency was determined for this 75 cm$^2$ composite hollow-fiber membrane module at a single feed water flowrate of 32 mL/min with the result shown in Table IX.

This datum was plotted on semilogarithmic coordinates (see FIG. 12, Plot E) for comparison with the performance of the other module tested, and results were analyzed by the procedure described above. The negative of the slope of the line shown for this unit in FIG. 12 yields a value of 0.166 cm/min (2.77×10$^{-3}$ cm/sec) for the overall radon mass transfer coefficient of this module containing a composite silicone(PDMS)-/polycarbonate-on-PAN hollow fiber membrane (see Table X). This value is about 124% that of the corresponding value for the spiral-wound module containing dense PDMS membrane described in Example 1.

Overall radon mass transfer coefficients determined in the above Examples for various membrane types and module designs are summarized in Table X below. It can be seen that measured coefficients vary by more than a

TABLE IX

RADON REMOVAL WITH A COMPOSITE HOLLOW-FIBER MEMBRANE MODULE BASED ON A SILICONE COPOLYMER
Nonporous Silicone/Polycarbonate Copolymer Film on Microporous PAN Hollow-Fiber Support Membrane
Membrane Area A = 75 cm$^2$

| Water Flowrate (cm$^3$/min) | A/V$_f$ (min/cm) | Fraction Rn Removed (X) | Fraction Rn Remaining(1 − X) |
|---|---|---|---|
| 32 | 2.34 | 0.322 | 0.678 | factor of 13 from the best performing device (the hollow-fiber module containing the PAN-supported silicone-based composite membrane) to the worst (the Model LP module containing microporous, hydrophilic PAN hollow fiber). The results of these Examples support the superiority of membranes based on nonporous silicone-rubber-containing polymers relative to porous membranes. The experimental results further indicate that, among the family of porous membranes, those based on hydrophobic and non-wetted polymers such as polypropylene are to be preferred over hydrophilic ones (e.g., regenerated cellulose and hydrophilic PAN copolymers) from the point of view of radon removal capacity. Both hollow-fiber (e.g., the experimental composite and the Questar devices) and spiral-wound (e.g., Sci-Med) membrane module designs have been shown capable of yielding high radon removal mass transfer coefficients—given their incorporation of suitably Rn-permeable membranes as taught by the present disclosure.

As will be apparent to those skilled in the art, many modifications and variations of this invention may be made without departing from its spirit and scope. The specific embodiments described herein are offered by way of example only, and the invention is limited only by the terms of the appended claims.

TABLE X
EXPERIMENTALLY DETERMINED RADON MASS TRANSFER COEFFICIENTS FOR VARIOUS MEMBRANE/MODULE TYPES

| Module Designation | Membrane Material | Membrane Type | Overall Mass Transfer Coefficient (cm/min) |
|---|---|---|---|
| Sci-Med 0400-2A | PDMS (hydrophobic) | Nonporous | 0.134 |
| Questar/ Celanese | PP (hydrophobic) | Microporous | 0.0342 |
| Asahi AM-300 | RC (hydrophilic) | Porous (gel-type) | 0.0171 |
| Sepracor Model LP | PAN-based Copolymer (hydrophilic) | Asymmetric, Microporous | 0.0126 |
| Expt'al. Composite | PDMS/PC on PAN Fiber (hydrophobic coating) | Composite (dense coating on porous support) | 0.166 |

What is claimed is:

1. A system for reducing the naturally-occuring dissolved radon content of radon-containing water supplied from a groundwater source, comprising:
   a) a housing, defining a water inlet, a water outlet, a stripping-air inlet and a stripping-air outlet;
   b) a radon-permeable membrane disposed within the housing, wherein the housing and a first surface of the radon-permeable membrane define a first chamber which provides fluid communication between the water inlet and the water outlet, and wherein the housing and second surface of the radon-permeable membrane define a second chamber which is distinct from the first chamber and which provides fluid communication between the stripping-air inlet and the stripping-air outlet, whereby the radon-permeable membrane maintains separation between radon-containing water passing through the first chamber from the water inlet to the water outlet and stripping air passing through the second chamber from the stripping-air inlet to the stripping-air outlet, while allowing naturally-occuring dissolved radon to migrate from the water through the radon-permeable membrane to the second chamber;
   c) a water recirculation conduit in fluid communication with both the water inlet and water outlet of the housing;
   d) a pump disposed at the recirculation conduit, whereby activation of said water recirculation pump causes at least a portion of the radon-containing water passing out of the first chamber through the water outlet to be directed through the recirculation conduit and to the water inlet for recirculation of the water through the first chamber; and
   e) means for passing stripping air through the second chamber from the stripping-air inlet to the stripping-air outlet,
   whereby the stripping air transports radon in the second chamber from the second chamber through the stripping-air outlet for discharge to the atmosphere, thereby reducing the naturally occuring dissolved radon content of the water.

2. The system of claim 1 further comprising a water storage vessel in fluid communication with said first chamber and with said water recirculation conduit and pump.

3. A system for reducing the naturally-occuring dissolved radon content of radon-containing water supplied from a groundwater source, comprising:
   a) a housing, defining a water inlet, a water outlet, a stripping-air inlet and a stripping-air outlet;
   b) a radon-permeable membrane disposed within the housing, wherein the housing and a first surface of the radon-permeable membrane define a first chamber which provides fluid communication between the water inlet and the water outlet, and wherein the housing and second surface of the radon-permeable membrane define a second chamber which is distinct from the first chamber and which provides fluid communication between the stripping-air inlet and the stripping-air outlet, whereby the radon-permeable membrane maintains separation between radon-containing water passing through the first chamber from the water inlet to the water outlet and stripping air passing through the second chamber from the stripping-air inlet to the stripping-air outlet, while allowing naturally-occuring dissolved radon to migrate from the water through the radon-permeable membrane to the second chamber;
   c) means for passing stripping air through the second chamber from the stripping-air inlet to the stripping-air outlet, whereby the stripping air transports radon in the second chamber from the second chamber through the stripping-air outlet for discharge to the atmosphere and the naturally-occuring dissolved radon content of the water is reduced; and
   d) a vessel containing an activated carbon adsorbent for further removal of remaining radon from water emerging from the water exit of the housing containing said radon-permeable membrane, the water inlet of said vessel being in fluid communication with the water outlet of said first chamber, whereby the naturally occuring dissolved radon content of the water is further reduced.

4. A method of reducing the naturally-occuring dissolved radon content of radon-containing water supplied from a groundwater source, comprising the steps of:
   a) passing the radon-containing water from a water inlet to a water outlet of a first chamber, which is defined by a housing and a first surface of a radon-permeable membrane disposed within the housing, the first chamber providing fluid communication between the water inlet and the water outlet, whereby the radon-containing water passes over the first surface of the radon-permeable membrane;
   b) passing stripping air from a stripping-air inlet to a stripping-air outlet of a second chamber, which is defined by the housing and second surface of the radon-permeable membrane and which provides fluid communication between the stripping-air inlet and the stripping-air outlet, the radon-permeable membrane maintaining separation between the radon-containing water passing through the first chamber and the stripping air passing through the second chamber, while allowing naturally-occuring dissolved radon to migrate from the water through the radon-permeable membrane to the stripping air;

c) recirculating said membrane treated water through a recirculation conduit in fluid communication with both the water inlet and the water outlet of the housing by means of a water recirculation pump disposed at the recirculation conduit, whereby activation of said water recirculation pump causes at least a portion of the water passing out of the first chamber through the water outlet to be directed through the recirculation conduit and to the water inlet for recirculation of the water through the first chamber;

whereby the stripping air passes over the second surface of the radon-permeable membrane and transports radon through the stripping-air outlet for discharge of the radon to the atmosphere, thereby reducing the naturally occuring dissolved radon content of the water.

5. The method of claim 4 further comprising recirculating at least a portion of said membrane treated water through a water storage vessel in fluid communication with said first chamber and with said water recirculation conduit and pump;

wherein said membrane treated water is directed from said water outlet of the first chamber to said storage vessel and from said storage vessel to said recirculation conduit; and a portion of said stored water can be removed as product.

6. A method of reducing the naturally-occuring dissolved radon content of radon-containing water supplied from a groundwater source, comprising the steps of:

a) passing the radon-containing water from a water inlet to a water outlet of a first chamber, which is defined by a housing and a first surface of a radon-permeable membrane disposed within the housing, the first chamber providing fluid communication between the water inlet and the water outlet, whereby the radon-containing water passes over the first surface of the radon-permeable membrane;

b) passing stripping air from a stripping-air inlet to a stripping-air outlet of a second chamber, which is defined by the housing and second surface of the radon-permeable membrane and which provides fluid communication between the stripping-air inlet and the stripping-air outlet, the radon-permeable membrane maintaining separation between the radon-containing water passing through the first chamber and the stripping air passing through the second chamber, while allowing naturally-occuring dissolved radon to migrate from the water through the radon-permeable membrane to the stripping air, whereby the stripping air passes over the second surface of the radon-permeable membrane and transports radon through the stripping-air outlet for discharge of the radon to the atmosphere, thereby reducing the naturally occuring dissolved radon content of the water; and c) further passing said membrane treated water from the water outlet of the first chamber to the water inlet of an activated carbon adsorption system, whereby remaining naturally occuring dissolved radon content of the water is further reduced.

* * * * *